(12) United States Patent
Hirata et al.

(10) Patent No.: US 12,133,140 B2
(45) Date of Patent: Oct. 29, 2024

(54) STORE SYSTEM, STATUS DETERMINATION METHOD, AND NON-TRANSITORY COMPUTER-READABLE MEDIUM

(71) Applicant: SATO HOLDINGS KABUSHIKI KAISHA, Tokyo (JP)

(72) Inventors: Kazuya Hirata, Tokyo (JP); Ayumi Kurihara, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 405 days.

(21) Appl. No.: 17/429,713

(22) PCT Filed: Dec. 12, 2019

(86) PCT No.: PCT/JP2019/048824
§ 371 (c)(1),
(2) Date: Aug. 10, 2021

(87) PCT Pub. No.: WO2020/170574
PCT Pub. Date: Aug. 27, 2020

(65) Prior Publication Data
US 2022/0132275 A1      Apr. 28, 2022

(30) Foreign Application Priority Data

Feb. 18, 2019   (JP) ................. 2019-026942

(51) Int. Cl.
*H04W 4/029*    (2018.01)
*G06Q 30/0201*  (2023.01)
(Continued)

(52) U.S. Cl.
CPC ........ *H04W 4/029* (2018.02); *G06Q 30/0201* (2013.01); *H04W 4/021* (2013.01); *H04W 4/80* (2018.02)

(58) Field of Classification Search
CPC .......... G06Q 30/0201; H04W 4/021
(Continued)

(56) References Cited

U.S. PATENT DOCUMENTS 9,959,437 B1    5/2018 Ramos et al.
2002/0170961 A1* 11/2002 Dickson ............. G06Q 30/02
                                                                235/383
(Continued)

FOREIGN PATENT DOCUMENTS

JP    2006-301823 A    11/2006
JP    2009-199517 A    9/2009
(Continued)

OTHER PUBLICATIONS

Extended European Search Report, Application No. 19916025.0, Mar. 16, 2022, 8 pages.

*Primary Examiner* — Fabricio R Murillo Garcia
(74) *Attorney, Agent, or Firm* — Foley & Lardner LLP

(57) ABSTRACT

A store system includes a position information acquisition unit that acquires position information of an RFID medium attached to an item and position information of a visitor terminal carried by a visitor, an event detection unit that detects an event that the RFID medium or the visitor terminal enters or leaves a predetermined area in a store space based on the acquired position information, an event information storage unit that stores event information including an ID that identifies the RFID medium or the visitor terminal, information about the predetermined area based on the position information, and a detection time of the event, and a status determination unit that determines a status, which is a state of the item or is an action content of the visitor, based on the event information.

11 Claims, 14 Drawing Sheets

(51) Int. Cl.
*H04W 4/021* (2018.01)
*H04W 4/80* (2018.01)

(58) Field of Classification Search
USPC ....................................................... 455/456.1
See application file for complete search history.

(56) References Cited

U.S. PATENT DOCUMENTS

| | | | |
|---|---|---|---|
| 2007/0233548 A1* | 10/2007 | Okawa | G06Q 10/063 |
| | | | 705/5 |
| 2008/0074264 A1* | 3/2008 | Sharpe | H04L 67/53 |
| | | | 340/572.1 |
| 2014/0164282 A1 | 6/2014 | Asbury | |
| 2014/0365334 A1 | 12/2014 | Hurewitz | |
| 2015/0244992 A1* | 8/2015 | Buehler | G08B 13/19608 |
| | | | 348/159 |
| 2015/0379791 A1 | 12/2015 | Russell et al. | |
| 2016/0055360 A1* | 2/2016 | Haugarth | G06Q 30/0201 |
| | | | 340/10.1 |
| 2016/0125430 A1* | 5/2016 | Ohkubo | G06Q 30/0201 |
| | | | 705/7.29 |
| 2016/0180404 A1 | 6/2016 | Stern et al. | |
| 2018/0204163 A1 | 7/2018 | Bender et al. | |
| 2021/0186329 A1* | 6/2021 | Tran | A43B 3/42 |

FOREIGN PATENT DOCUMENTS

| | | |
|---|---|---|
| JP | 2017-211770 A | 11/2017 |
| WO | WO 2005/111880 A1 | 11/2005 |
| WO | WO-2013/126391 A1 | 8/2013 |

\* cited by examiner

| EVENT NO | Tag ID | AREA | IN | OUT | STATUS | CUSTOMER SERVICE SUPPORT INFORMATION |
|---|---|---|---|---|---|---|
| M001 | 1001 | 901 | 2018/12/1 15:20:20 | 2018/12/1 15:21:35 | STAYING | |
| M002 | 1001 | 902 | 2018/12/1 15:21:36 | 2018/12/1 15:21:38 | PASSING | |
| M003 | 1001 | 903 | 2018/12/1 15:21:39 | 2018/12/1 15:21:41 | PASSING | |
| M004 | 1001 | 904 | 2018/12/1 15:21:42 | 2018/12/1 15:21:43 | PASSING | |
| M005 | 1001 | 929 | 2018/12/1 15:22:02 | 2018/12/1 15:24:42 | TAKING OUT ITEM | ○ |
| M006 | 1001 | 948 | 2018/12/1 15:25:31 | 2018/12/1 15:30:02 | TRYING ON | |
| M007 | 1001 | 929 | 2018/12/1 15:30:50 | 2018/12/1 15:31:12 | RETURNING ITEM | |
| M008 | 1001 | 931 | 2018/12/1 15:30:41 | 2018/12/1 15:31:56 | STAYING | |
| M009 | 1001 | 934 | 2018/12/1 15:32:28 | 2018/12/1 15:34:40 | TAKING OUT ITEM | ○ |
| M010 | 1001 | 949 | 2018/12/1 15:35:08 | 2018/12/1 15:40:16 | TRYING ON | |
| M011 | 1001 | 946 | 2018/12/1 15:41:22 | 2018/12/1 15:45:38 | PURCHASING | |
| S001 | 2001 | 941 | 2018/12/1 15:19:16 | 2018/12/1 15:24:05 | STAYING | NOTIFICATION |
| S002 | 2001 | 929 | 2018/12/1 15:24:16 | 2018/12/1 15:24:40 | IN CUSTOMER SERVISE | |
| S003 | 2001 | 934 | 2018/12/1 15:32:40 | 2018/12/1 15:34:38 | IN CUSTOMER SERVISE | ○ |
| S004 | 2001 | 949 | 2018/12/1 15:35:08 | 2018/12/1 15:35:42 | IN CUSTOMER SERVISE | |
| I001 | 3001 | 929 | | 2018/12/1 15:24:41 | TAKEN OUT | ○ |
| I002 | 3001 | 948 | 2018/12/1 15:25:31 | 2018/12/1 15:30:02 | TRIED ON | |
| I003 | 3001 | 929 | 2018/12/1 15:30:50 | | RETURNED | |
| I004 | 3002 | 934 | | 2018/12/1 15:34:20 | PRICE TAG CONFIRMED | ○ |
| I005 | 3002 | 934 | | 2018/12/1 15:34:40 | TAKEN OUT | ○ |
| I006 | 3002 | 949 | 2018/12/1 15:35:08 | 2018/12/1 15:40:40 | TRIED ON | |
| I007 | 3002 | 946 | 2018/12/1 15:41:22 | | PURCHASED | |

FIG.9

STORE SYSTEM, STATUS DETERMINATION METHOD, AND NON-TRANSITORY COMPUTER-READABLE MEDIUM

TECHNICAL FIELD

The present invention relates to a store system, a status determination method, and a program.

BACKGROUND ART

Computer systems have been devised to improve efficiency of store operations and increase sales.

JP2006-301823A discloses a marketing system for collecting a time when an item is taken out of a counter, a time when the item is returned, and a time when the item is purchased from a radio frequency (RF) tag or an RF antenna attached to the item and a register, so as to obtain a state (status) of each item and a frequency at which the item is picked up. Furthermore, in this marketing system, a depth of interest of a customer for each item is derived based on collected information, and improvement plans for changing item attributes (price, size, material, color, and the like) and display locations are presented.

SUMMARY OF INVENTION

In JP2006-301823A, it is only possible to understand when and how long a visitor picked up which item, and it is not possible to obtain position information such as how the item and the visitor move. Since a receiver that receives radio waves is installed on an item shelf, it is difficult to collect information at locations other than the item shelf. Furthermore, a state (status) of the visitor cannot be determined.

An object of the present invention is to determine states (statuses) of an item and a visitor.

According to one aspect of the present invention, a store system includes: a position information acquisition unit configured to acquire position information of an RFID medium attached to an item and position information of a visitor terminal carried by a visitor; an event detection unit configured to detect an event that the RFID medium or the visitor terminal enters or leaves a predetermined area in a store space based on the acquired position information; an event information storage unit configured to store event information including an ID that identifies the RFID medium or the visitor terminal, information about the predetermined area based on the position information, and a detection time of the event; and a status determination unit configured to determine a status, which is a state of the item or is an action content of the visitor, based on the event information.

According to one aspect of the present invention, the states (statuses) of the item and the visitor can be specified based on the event information including the information such as the item and the visitor entering a set area and leaving the set area.

BRIEF DESCRIPTION OF DRAWINGS

FIG. 9 is an example of a list of event information.

DESCRIPTION OF EMBODIMENTS

Hereinafter, a store system 1 according to an embodiment of the present invention is described with reference to the drawings.

The store system 1 is a system capable of continuously acquiring position information of an item, a store clerk, and a visitor at a store 100, and determining a state (status) of each entity. The state (status) is selected from typified contents.

Figure 1:
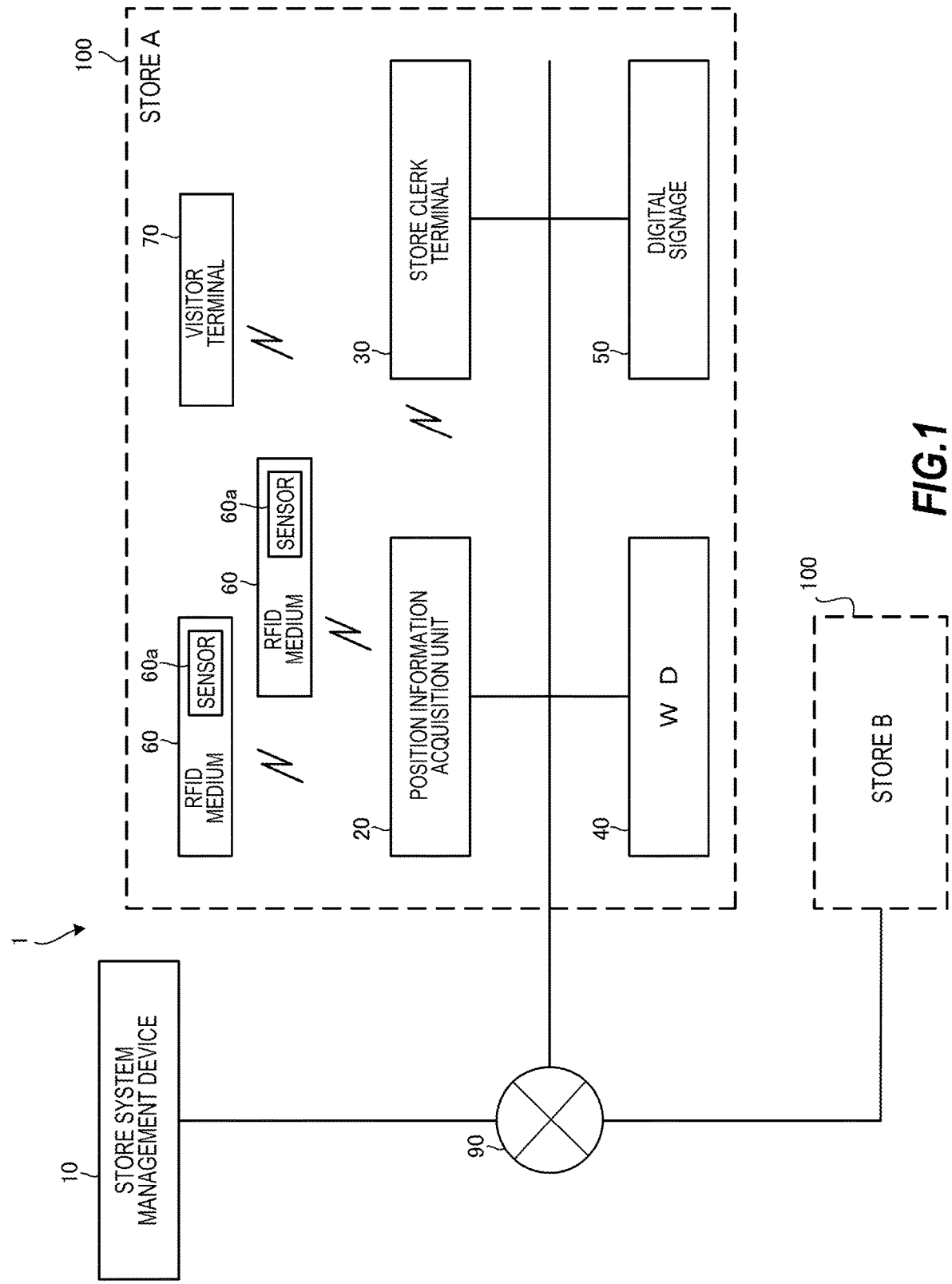
FIG. 1 is a block diagram of a store system according to an embodiment of the present invention.

First, the store system 1 is described with reference to FIG. 1. FIG. 1 is a block diagram illustrating an outline of the store system 1.

As shown in FIG. 1, the store system 1 includes a store system management device 10 and is connected to one or more stores 100 via a line network 90.

The line network 90 may be, for example, the Internet, a virtual private network (VPN), or a physical dedicated line that does not utilize the Internet. The line network 90 may be an intranet. The store system 1 may also adopt a form in which the store system management device 10 is provided in the store 100, and may be a system that is completed only inside the store 100.

The store system management device 10 is, for example, a computer that functions as a server, but may be provided in a cloud environment, that is, software and a database are entities thereof. Therefore, an installation location of the store system management device 10 may be either inside or outside the store 100, and may be a virtual server that can be realized by a virtualization technique.

The store 100 is, for example, a set of various devices and equipment formed in a unit of one facility of the store. As shown in FIG. 1, the store 100 includes, for example, a position information acquisition unit 20, a store clerk terminal 30 used by a store clerk for work, a wearable display (WD) 40, and a digital signage 50. The store system 1 detects a radio frequency identifier (RFID) medium 60 attached to the item or the like, and detects a visitor terminal 70 when a visitor is present. In addition, the store 100 may include a register, a stock management unit, a smart speaker, a guidance robot, and the like, which are not shown.

The position information acquisition unit 20, the store clerk terminal 30, the WD 40, and the digital signage 50 are each connected to the store system 1 wiredly or wirelessly. As a form (topology) of the network in the store 100, a bus type, a tree type, a star type, a ring type, a mesh type, and other known forms can be adopted. PLC (outlet LAN) can be included as wired connection. A connection form is the same for the store system 1, and the store system 1 and the store 100 can be provided with a storage device such as a network attached storage (NAS), which is not shown.

The position information acquisition unit 20 is a unit configured to receive radio waves transmitted by the store clerk terminal 30 including the WD 40, radio waves transmitted by the RFID medium 60, and radio waves transmitted by the visitor terminal 70 carried by the visitor, and acquire position information of a transmitter of the radio wave. Since these radio waves include information that identifies the transmitter of the radio wave (hereinafter referred to as ID), an ID is also acquired when the position information is acquired. The position information acquisition unit 20 is, for example, a locator, and is capable of acquiring the position information and the like even by one-point positioning based on radio wave intensity and an incident angle of the radio wave. Therefore, the number of installations of the position information acquisition units 20 does not need to be plural, but an appropriate number of installations are required according to a store area, a store shape, surrounding environment, and the like.

The store clerk terminal 30 is a terminal used by the store clerk for work, and corresponds to an input/output unit of the store system management device 10. For example, tablets, smartphones, smart watches, and stationary computers are envisioned. The store clerk terminal 30 can include the WD 40. In essence, the store clerk terminal 30 is an application that can be installed on these electronic devices. Therefore, the store clerk terminal 30 may be an electronic device owned by the store clerk personally.

The WD 40 is a wearable display that the store clerk attaches to or wears on a body. Examples thereof include a spectacle-shaped head-mounted display that is worn on a head. Since the WD 40 can communicate via radio waves, the position information of the store clerk can also be acquired by the WD 40. The WD 40 detects a direction of the head of the store clerk wearing the WD 40 and detects a field of view of the store clerk. The WD 40 may measure movement of eyeballs of the store clerk to detect a line of sight of the store clerk.

The digital signage 50 is an advertising medium that promotes sales to the visitor as an electronic signboard. A storefront point of purchase (POP) can also be included in the digital signage 50 if a display content can be changed by computer control.

The RFID medium 60 is a radio wave transmitter containing an RFID. Examples thereof include a tag or label attached to the item. The RFID medium 60 can be attached to a shopping cart or a shopping basket in addition to the item. RFID may be any one of a passive type that operates using radio waves from an outside as starting power, an active type provided with a power supply, and a semi-active type that is provided with a power supply and operates when a specific signal from the outside is received. The RFID medium 60 may adopt Bluetooth low energy (BLE), which is one of the BLUETOOTH (JP registered trademark) standards, and can communicate with other devices. A sensor 60a can be provided on the RFID medium 60, and it is possible to detect by pressure that the RFID medium is picked up. As a result, the store system 1 can acquire information indicating that the visitor picked up the RFID medium 60 (that is, a price tag) displaying an item price and confirmed the item price. As a method for detecting that the RFID medium is picked up, a method of providing the RFID medium 60 with a current sensor for detecting a bioelectric current, which is a weak current flowing through a human body, can also be adopted.

Figure 2:
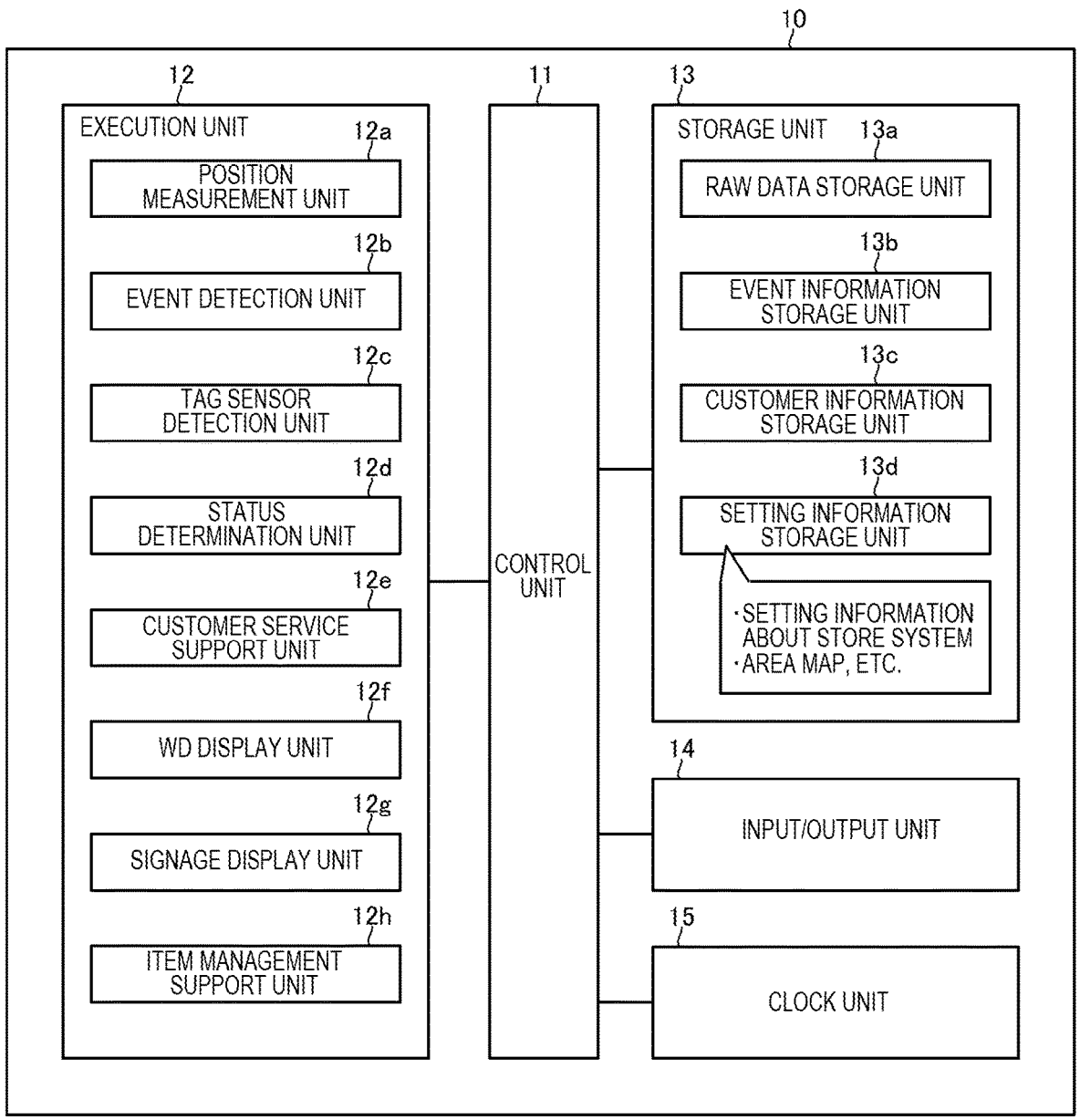
FIG. 2 is a block diagram of a store system management device.

FIG. 2 is a block diagram illustrating a configuration of the store system management device 10.

The store system management device 10 includes a control unit 11, an execution unit 12, a storage unit 13, an input/output unit 14, and a clock unit 15 as main configurations.

The control unit 11 is connected to each of the execution unit 12, the storage unit 13, the input/output unit 14, and the clock unit 15, and controls each of these units and executes predetermined processing to realize various functions. That is, the control unit 11 includes both a bus-like element and a CPU-like element, but considering that the store system management device 10 may be provided by the cloud environment, the control unit 11 may be a computing device or software that controls the store system management device 10.

The execution unit 12 is a program stored in a storage unit such as a ROM. The execution unit 12 includes a position measurement unit 12a, an event detection unit 12b, a status determination unit 12d, a tag sensor detection unit 12c, a customer service support unit 12e, a WD display unit 12f, a signage display unit 12g, and an item management support unit 12h.

The position measurement unit 12a is a unit (calculation unit) for measuring the position of the transmitter of the radio wave from the received radio wave if the position information acquisition unit 20 is simply an antenna-like device that receives the radio wave. As will be described later, since the position measurement unit 12a may be mounted by the position information acquisition unit 20, the store system management device 10 does not necessarily include the position measurement unit 12a.

Exemplarily, the position information is acquired as coordinate data. The store space is divided into a plurality of areas (subdivided store spaces) in order to implement functions of the store system 1. The store system management device 10 also determines which area a measured coordinate value corresponds to.

Exemplarily, the position measurement unit 12a measures the position of the transmitter of the radio wave at a rate of 5 times per second. The store system management device 10 generates raw data in which an ID and a time acquired from the clock unit 15 are added to the measured position information as time series position data.

The event detection unit 12b is a unit configured to detect an event that the transmitter of the radio wave enters or leaves a predetermined area. When the event is detected, event information is generated or updated. The event information includes a data structure common to the raw data, for example, including information about an ID, area information where the transmitter is located (or the position information such as the coordinate value), a time when the transmitter enters the area, and a time when the transmitter leaves the area. The event information can include information about the status described later.

The tag sensor detection unit 12c is a unit configured to detect an operation signal of the sensor 60a included in the RFID medium 60. The operation signal is included in the radio wave transmitted by the RFID medium 60. As described above, the sensor 60a is a sensor that detects that the RFID medium 60 is picked up, and a pressure sensor and a current sensor correspond to the sensor 60a.

The status determination unit 12d is a unit configured to determine the state (status) of the item or the visitor. The status is categorized. For example, the status of the item includes "taken out," "returned," "price tag confirmed," "purchased," and the like. The status of the visitor includes "passing," "staying," "taking out item," "confirming price tag," "returning item," "trying on," and the like. The status determination unit 12*d* can also determine the status of the store clerk, and the status of the store clerk includes "try-on customer service," "cash register customer service," "guidance," "item returning," and the like. The determined status is given to the event information. The "purchase" may be reflected in the status based on sales information received from the register (not shown) by the store system management device 10 for example.

The customer service support unit 12*e* is a unit configured to transmit a timing when the store clerk acts on the visitor (customer service support information) based on the event information of the visitor and the status of the visitor to the store clerk terminal 30 and the WD 40. General visitors have a psychology of wanting to see items at will without being asked by the store clerk, and not being able to enjoy shopping if constantly receiving active customer service. Therefore, the customer service support unit 12*e* determines the effective timing when the store clerk acts on the visitor.

The WD display unit 12*f* is a unit configured to transmit information to be displayed on the WD 40. The WD display unit 12*f* can detect the field of view of the store clerk based on the direction of the head of the store clerk wearing the WD 40, and transmits information about the item and the visitor according to the field of view of the store clerk. If the WD 40 can detect the line of sight of the store clerk based on the movement of the eyeballs of the store clerk, the WD display unit 12*f* transmits the information about the item and the visitor according to the line of sight of the store clerk in addition to the field of view of the store clerk.

The signage display unit 12*g* is a unit configured to transmit information to be displayed to the digital signage 50. For example, if the visitor holds the item for a long time, it is determined that the visitor is uncertain about purchase of the item, and a coupon or the like for supporting the purchase is sent to the digital signage 50 near the visitor. The coupon can be transmitted to the visitor terminal 70, and the signage display unit 12*g* also controls the transmission of the coupon to the visitor terminal 70.

The item management support unit 12*h* is a unit configured to transmit information of an item that is moved from an original counter to another location in the store and is not returned to the original counter to the store clerk terminal 30 including the WD 40. Since the item that is not returned to the original counter is a so-called lost item and causes a loss of sales opportunity, the loss of sales opportunity can be avoided by promptly returning the lost item to the original counter.

As described above, since the execution unit 12 is actually a program, the units 12*a* to 12*h* do not need to be stored as a unit (collectively in a specific storage area or a specific storage device), and may be provided in an external device or the like of the store system management device 10. As an example, since the position measurement unit 12*a* is a program that measures the position of the transmitter of the radio wave from the intensity and the incident angle of the received radio wave, the program may be implemented by the position information acquisition unit 20. One or a plurality of the units 12*a* to 12*h* can be recognized separately as an independent system. As an example, the customer service support unit 12*e* can function as a customer service support system together with the position measurement unit 12*a*, the event detection unit 12*b*, the tag sensor detection unit 12*c*, and the status determination unit 12*d*. Similarly, the item management support unit 12*h* can function as an item management support system together with the position measurement unit 12*a*.

Next, the storage unit 13 is described. The storage unit 13 is a memory, a hard disk, or other known storage device, and includes a storage device constructed as a database and a storage for backup. The storage unit 13 includes a raw data storage unit 13*a*, an event information storage unit 13*b*, a customer information storage unit 13*c*, and a setting information storage unit 13*d*. These storage units 13*a* to 13*d* do not need to be collectively provided in a specific storage area or a specific storage device.

The raw data storage unit 13*a* is an area configured to store the raw data constantly and continuously generated by the store system management device 10. Since many targets for acquiring the position information are present, only those with changes in the position information may be generated and stored as the raw data. As described above, for each transmitter of the radio wave, for example, five pieces of the raw data are generated per second, and the raw data for a predetermined period is stored in the raw data storage unit 13*a*. The raw data is stored for verification and collation, but since the store system 1 reaches the functions thereof when the event information is generated, the raw data storage unit 13*a* is not an indispensable configuration. In other words, the store system 1 is a system in the Internet of Things (IoT) field that extracts and utilizes some data from big data that is continuously collected from a large number of transmitters of radio waves, and can adopt a form in which only event information is stored.

The event information storage unit 13*b* is an area configured to store the event information. In general, the event information is first generated from an event in which the transmitter of the radio wave enters the predetermined area, and a time (IN) of entering the area is stored (see FIG. 9). Then, when it is detected that the transmitter of the radio wave leaves the area, a time (OUT) of leaving the area is added (updated) to the event information. When the transmitter of the radio wave without the IN moves, the event information is generated from the OUT. The event information is specified by an ID and area information. That is, when an event having a different ID or area information is detected from the event information stored so far, separate event information is generated. Then, when the transmitter of the radio wave moves in a plurality of areas one after another, the same number of pieces of the event information as the number of the plurality of areas is generated.

Some statuses can be determined based on the IN only or the OUT only, while others require both the IN and the OUT. Therefore, the status may be updated when the OUT information is added to the event information.

The customer information storage unit 13*c* is an area in which member information, member purchase information, and the like are stored, and is an area for storing event information in which an association has occurred for each ID. For example, it is recorded that the same member picked up a specific item a plurality of times and that the same member enters the same area a plurality of times.

The setting information storage unit 13*d* is an area for storing setting information in the store system 1. For example, a coordinate value for each area (area map) and what kind of conditions is detected as the event are stored.

The input/output unit 14 includes an interface of the store system management device 10 and a communication port including communication control, and is responsible for an overall I/O function.

The clock unit 15 is, for example, a real-time clock provided in the store system management device 10, but the store system 1 is also established by time information by the clock unit provided in the position information acquisition unit 20 and the like. That is, if the time information can be acquired from inside or outside the store system 1, the store system management device 10 does not need to include the clock unit 15.

Figure 3:
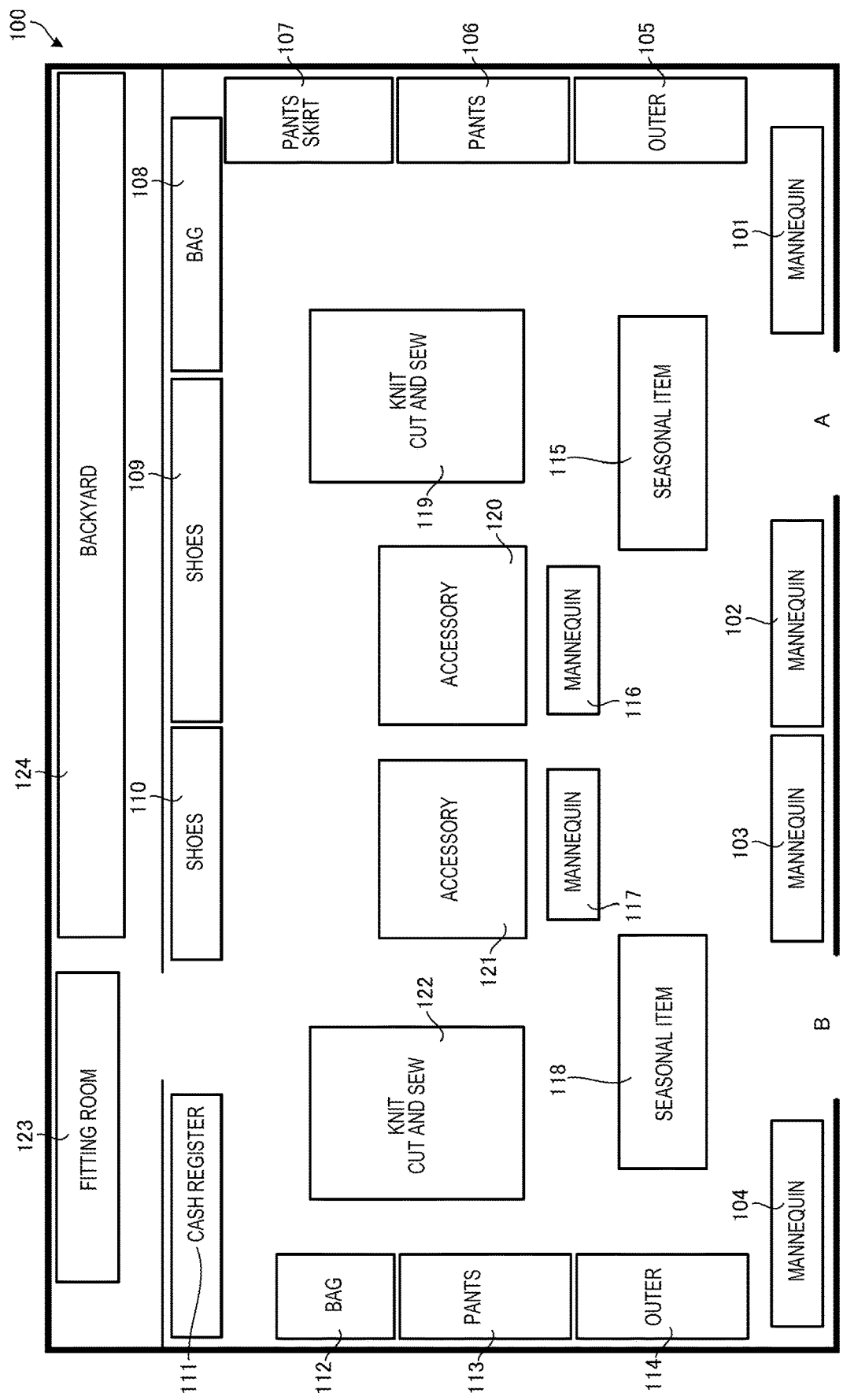
FIG. 3 is a sketch of a store.
Figure 4:
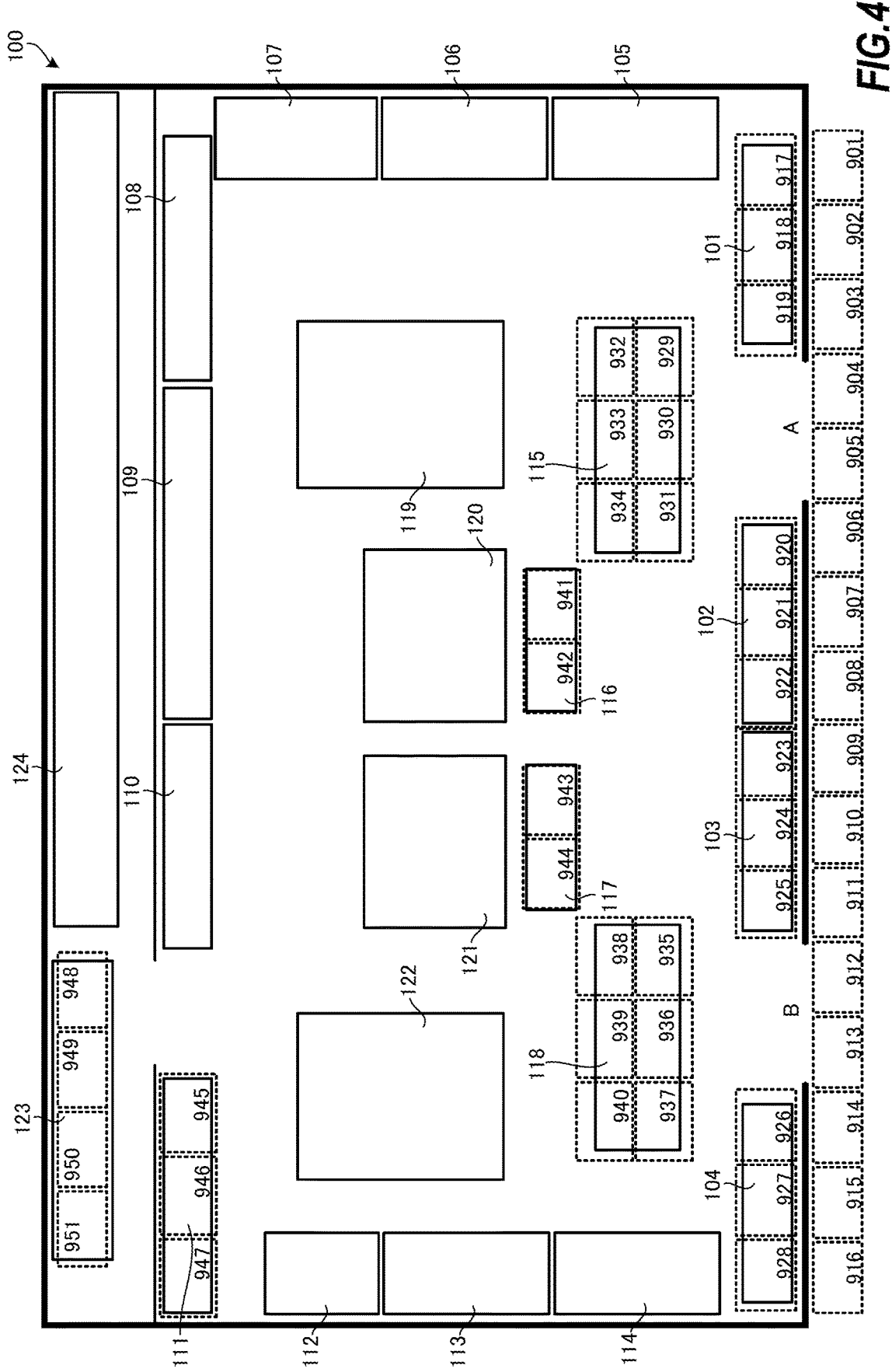
FIG. 4 is an area map illustrating area setting of the store.

Next, a configuration and area setting of the store 100 will be described with reference to FIGS. 3 and 4. FIG. 3 is a sketch of the store 100. FIG. 4 is an area map illustrating the area setting of the store 100.

FIG. 3 is a diagram illustrating a layout of the store 100. In the following, the store 100 will be explained as apparel store that handles clothing and miscellaneous goods, but a work format of the store 100 may be any work format as long as the visitor purchases items and services at the store.

In the store 100, for example, mannequins 101 to 104 are provided toward a road, a doorway A is provided between the mannequin 101 and the mannequin 102, and a doorway B is provided between the mannequin 103 and the mannequin 104. On a wall side of the store 100, an outer counter 105, a pants counter 106, a pants/skirt counter 107, a bag counter 108, a shoes counter 109, a shoes counter 110, a cash register 111, a bag counter 112, a pants counter 113, and an outer counter 114 are provided counterclockwise. Inside the store away from the wall side, counters are set up symmetrically, and to explain a layout of the counters on a right side, a seasonal item counter 115 is set up in front of the doorway A. A mannequin 116 is set up behind the seasonal item counter 115 on a left side, and a knit/cut and sew counter 119 is set up behind the seasonal item counter 115. An accessory counter 120 is set up on a left side of the knit/cut and sew counter 119. A fitting room 123 is set up behind the cash register 111, and a backyard 124 is set up on a right side of the fitting room 123. The position information acquisition unit 20 (see FIG. 1) is attached to any place such as ceiling, floor, and wall of the store 100.

Since the layout of the counters in FIGS. 4 to 8 is the same as that in FIG. 3, descriptions of names of the counters are omitted and only codes are shown.

FIG. 4 is an area map that visually shows areas in the store space related to occurrence of events. Each square represented by broken lines in the drawing corresponds to one area. The area is, for example, a rectangle having a side of 50 cm to 70 cm, and the areas with identification numbers from 901 to 951 are set. In the present application, the "area" means a predetermined store space set for detecting an event (extracting some data from big data), and a store space other than the areas is a non-area space.

Each area is mainly set at a stop-by location at the store 100, where is particularly desired to collect information, from action information of the visitor. The store space includes not only an inside of the store but also adjacent spaces, and the areas can be set for the adjacent spaces.

Specifically, the areas can be set not only inside but also outside the store 100, and areas 901 to 916 are set for locations corresponding to the road. In the store, areas 917 to 919 are set at positions corresponding to the mannequin 101. Areas 920 to 922 are set at positions corresponding to the mannequin 102. Areas 923 to 925 are set at positions corresponding to the mannequin 103. Areas 926 to 928 are set at positions corresponding to the mannequin 104. Areas 929 to 934 are set at positions corresponding to the seasonal item counter 115 on the right side. Areas 935 to 940 are set at positions corresponding to a seasonal item counter 118 on the left side. Areas 941 to 942 are set at positions corresponding to the mannequin 116. Areas 943 to 944 are set at positions corresponding to a mannequin 117. Areas 945-947 are set at positions corresponding to the cash register 111. Areas 948 to 951 are set at positions corresponding to the fitting room 123. A size and a setting position of each area can be set freely, and each area can include not only a planar range but also a value in a height direction (a coordinate value of a Z axis). Therefore, even when positions are the same on a plane, the positions can be divided into three areas of, for example, an upper area, a middle area, and a lower area, according to heights, and a position and a height of the transmitter of the radio wave can be acquired.

Next, with reference to FIGS. 5 to 9, information acquired, determined, and displayed by the store system 1 from the acquired radio wave will be described.

Figure 5:
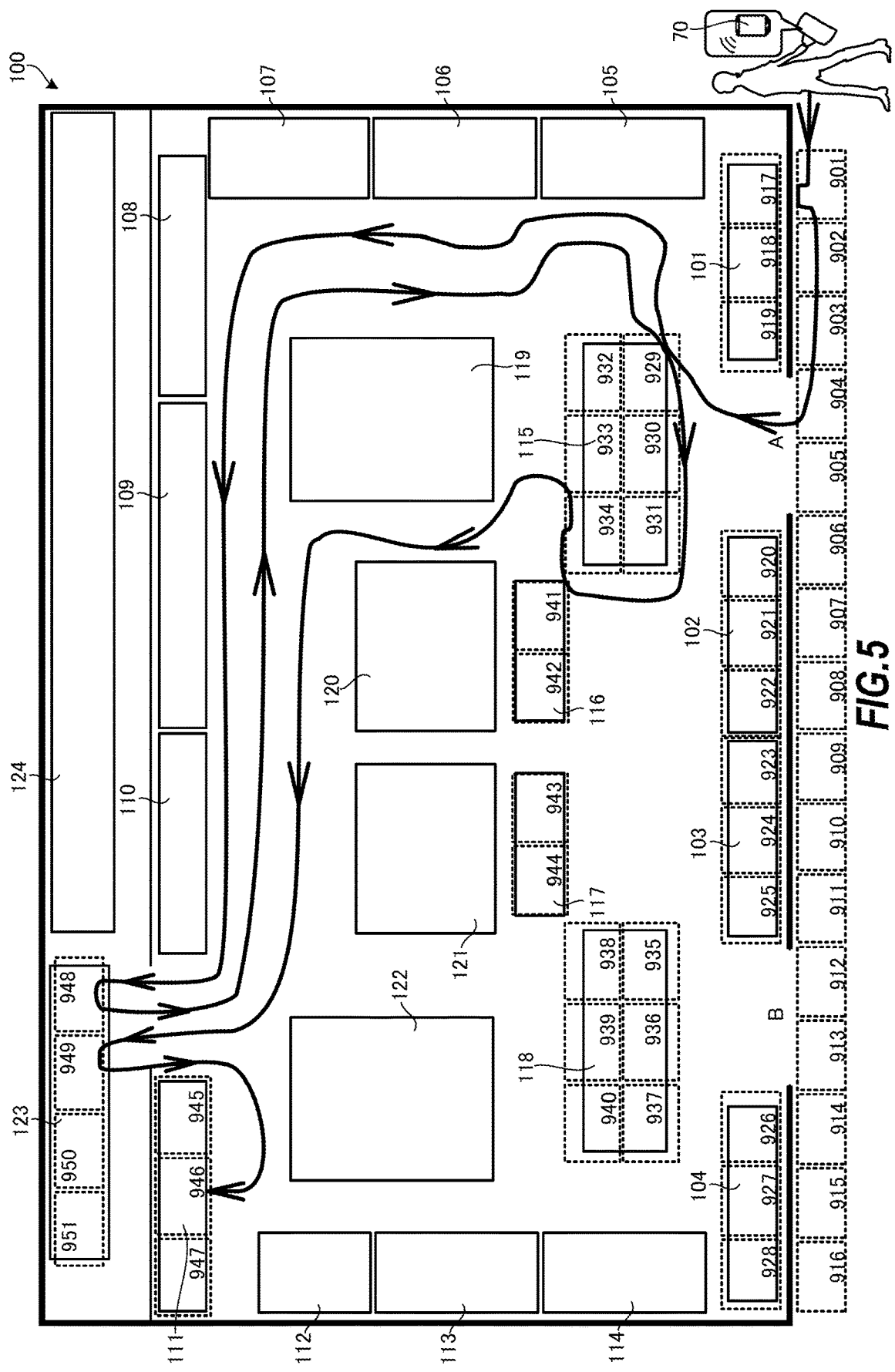
FIG. 5 is a diagram illustrating a flow line of a visitor.
Figure 6:
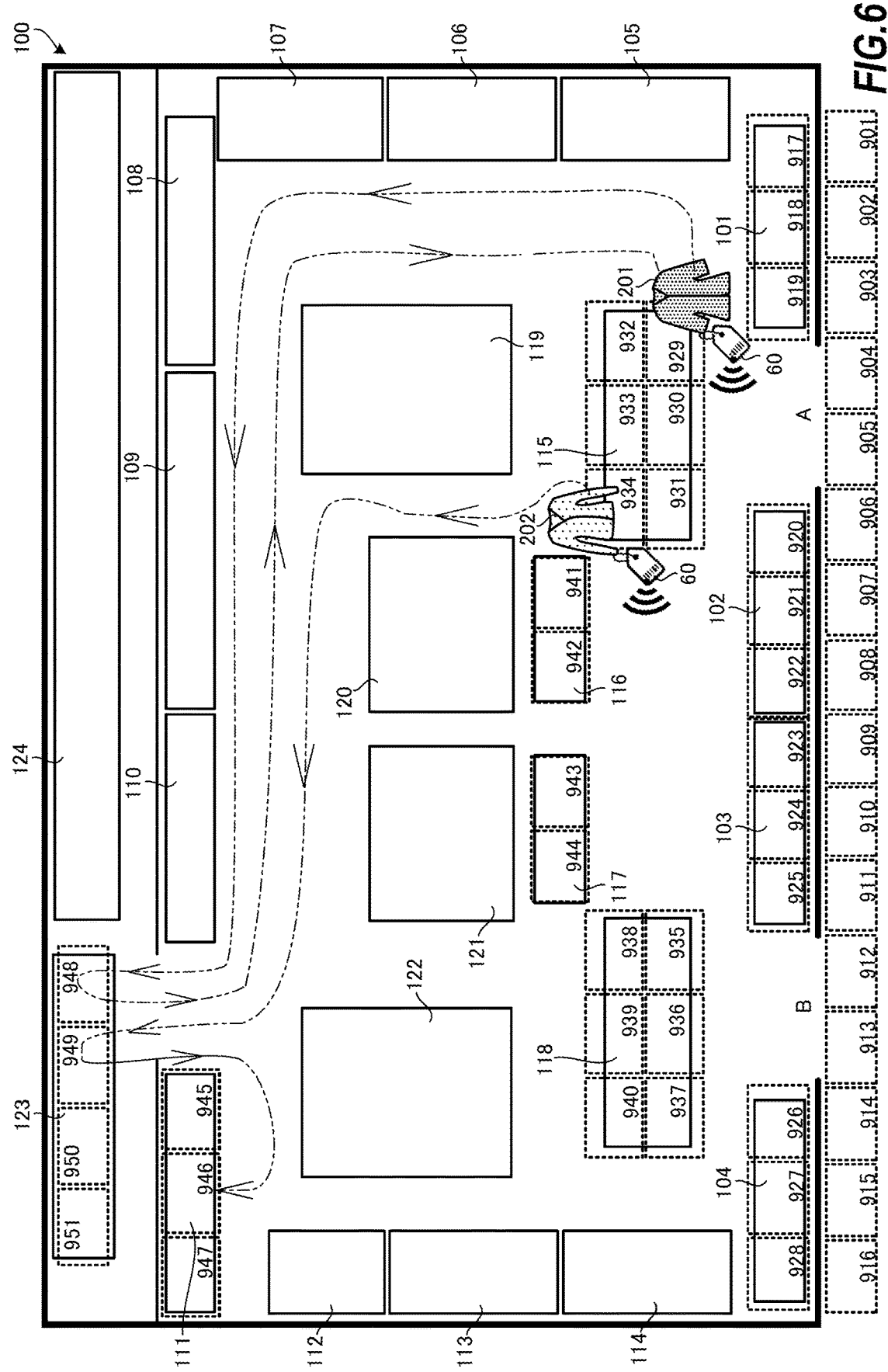
FIG. 6 is a diagram illustrating flow lines of items.
Figure 7:
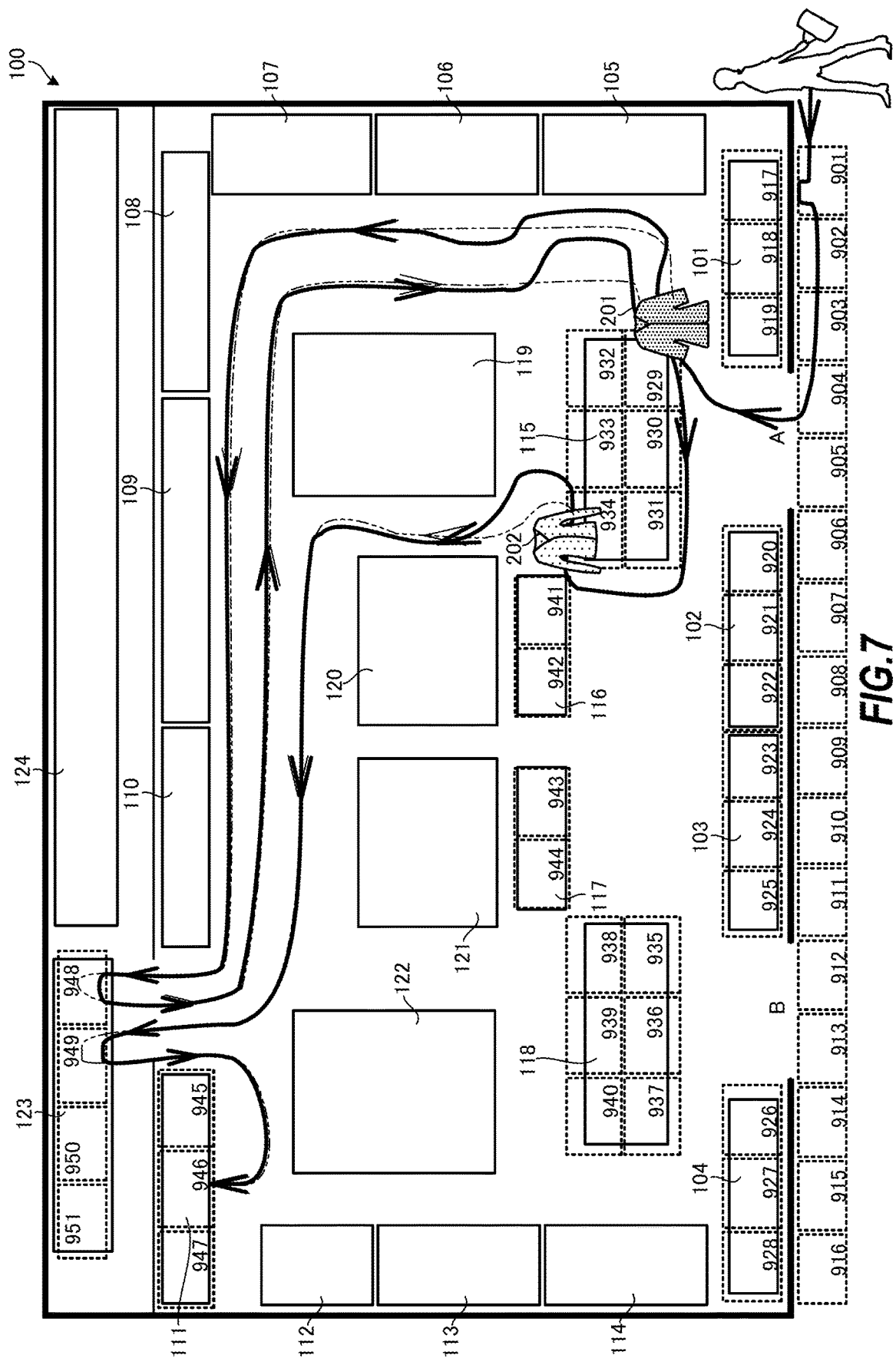
FIG. 7 is a diagram in which the flow line of the visitor and the flow lines of the items are superimposed.
Figure 8:
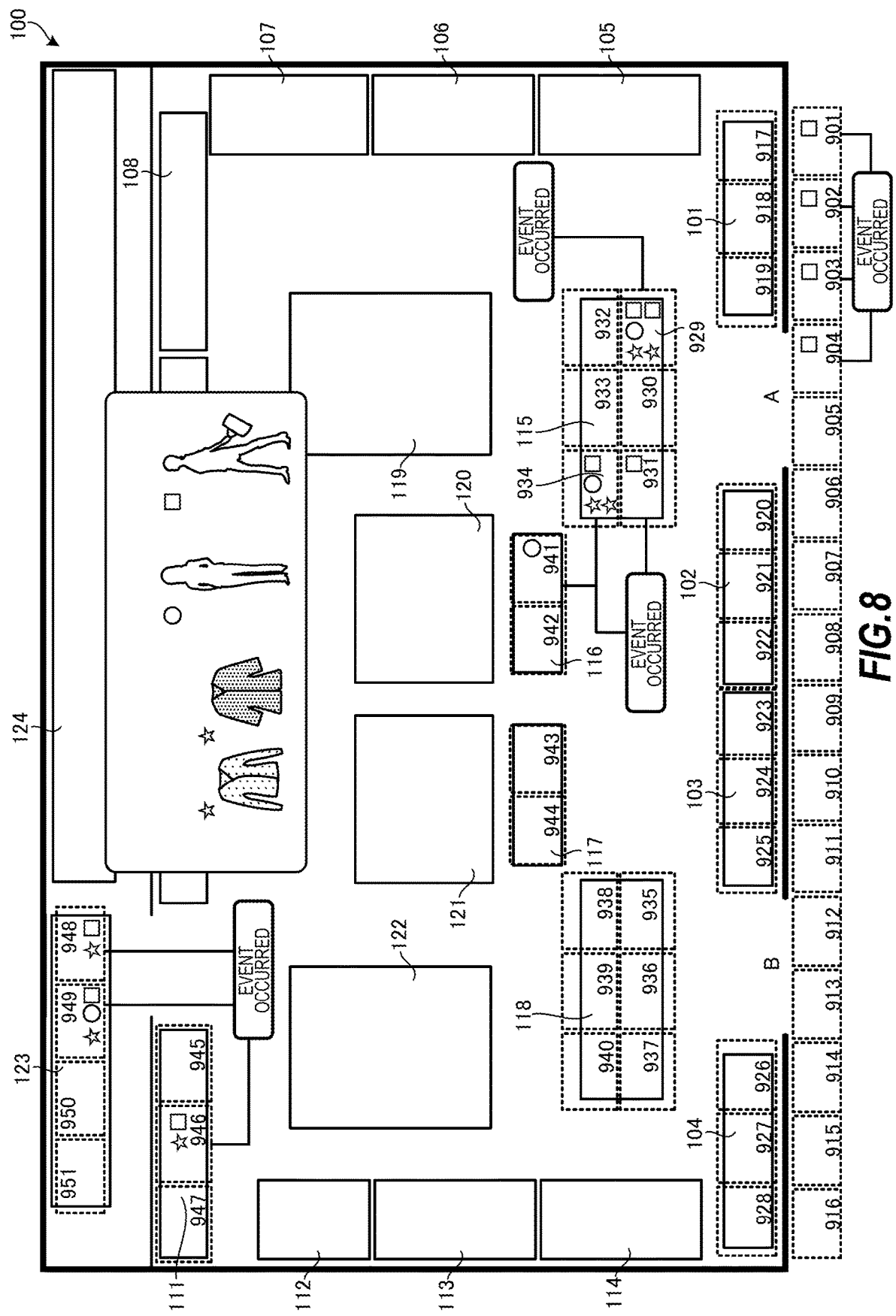
FIG. 8 is a diagram illustrating areas where events have occurred in the store.

First, how movement of the visitor and movement of the item are acquired will be explained. FIG. 5 is a diagram illustrating a flow line of the visitor. FIG. 6 is a diagram illustrating flow lines of items. FIG. 7 is a diagram in which the flow line of the visitor and the flow lines of the items are superimposed. FIG. 8 is a diagram illustrating areas where the events have occurred in the store. FIG. 9 is an example of a list of the event information.

In FIG. 5, the flow line of the visitor is shown by a solid line. The solid line is the position information acquired from the visitor terminal 70, and is a combination of position information in the raw data. Here, explanation will be focused on a movement route of the visitor.

The visitor walks on the road in front of the mannequin 101 from a right side of the store 100 and enters the store from the doorway A. The visitor who enters the store moves around the knit/cut and sew counter 119 from a right side via the seasonal item counter 115 on the right side, and enters the fitting room 123 (area 948). After leaving the fitting room 123, the visitor moves around the knit/cut and sew counter 119 from the left side and moves to the seasonal item counter 115 on the right side. Then, the visitor moves around the seasonal item counter 115 counterclockwise, moves between the knit/cut and sew counter 119 and the accessory counter 120, and enters the fitting room 123 (area 949). After leaving the fitting room, the visitor moves to the cash register 111. The above is a continuous route and coincides with the solid line in FIG. 5.

In FIG. 6, the flow lines of the two items are represented by double-dashed lines. A coat 201 placed in the area 929 and a jacket 202 placed in the area 934 are both items placed in the seasonal item counter 115 on the right side and are moved individually. Both the coat 201 and the jacket 202 are picked up and moved by the visitor. The double-dashed lines are the position information acquired from the RFID medium 60 attached to each item, and is a combination of the position information in the raw data.

First, a movement route of the coat 201 will be described. The coat 201 moves from the area 929 around the knit/cut and sew counter 119 from the right side and enters the fitting room 123 (area 948). After leaving the fitting room 123, the coat 201 moves around the knit/cut and sew counter 119 from the left side, moves to the area 929, and returns to the original area. The above is a continuous route and coincides with the double-dashed line starting from the coat 201 in FIG. 6.

Next, a movement route of the jacket 202 will be described. The jacket 202 moves from the area 934 between the knit/cut and sew counter 119 and the accessory counter 120 and enters the fitting room 123 (area 949). After leaving the fitting room 123, the jacket 202 moves to the cash register 111. The above is a continuous route and coincides with the double-dashed line starting from the jacket 202 in FIG. 6.

FIG. 7 is a diagram in which the movement route of the visitor and the movement routes of the coat 201 and the jacket 202 are superimposed. The movement route of the visitor and the movement routes of the coat 201 and the jacket 202 are almost the same, and it can be understood that the coat 201 and the jacket 202 are moved by the visitor.

FIG. 8 is a diagram in which symbols are marked for convenience in the areas where events have occurred. In notations in the areas, the visitor is represented by a square symbol, the store clerk is represented by a circle symbol, and the coat 201 and the jacket 202 are each represented by a star-shaped symbol.

According to the movement route of the visitor, the events occur in an order of the area 901, area 902, area 903, area 904, area 929, area 948, area 929, area 931, area 934, area 949, and area 946. In these areas, square symbols representing that the events based on the visitor occur are shown. Among these areas, in the area 929, two square symbols are shown since the visitor comes and goes twice.

Although a movement route of the store clerk is not explained, events occur in an order of the area 941, area 929, area 934, and area 949. In these areas, circle symbols representing that the events based on the store clerk occur are shown.

According to the movement route of the coat 201 or the jacket 202, events have occurred in an order of the area 929, area 948, area 934, area 949, and area 946. In these areas, star-shaped symbols representing that the events based on the item have occurred are shown. Two star-shaped symbols are shown in the area 934, and as explained by FIG. 9 below, events in which signals of the sensor 60*a* are detected in the area 934 have occurred.

FIG. 9 is an example of a list of event information that is generated during a prescribed period. Here, the events that have occurred to one visitor, one store clerk, and two items (coat 201, jacket 202) described in FIGS. 5 to 8 are shown. An ID of the visitor terminal 70 is "1001." An ID of the store clerk terminal 30 is "2001." An ID of the RFID medium 60 attached to the coat 201 is "3001," and an ID of the RFID medium 60 attached to the jacket 202 is "3002."

The event information includes the ID that identifies the transmitter of the radio wave (visitor, store clerk, item), the area information where the event occurred, the time of entering the area (IN), and the time of leaving the area (OUT). The event information further includes information about the status. In FIG. 9, for convenience of explanation, a column of Event No. (Number) and a column of customer service support information for explaining the event in which the customer service support information is notified to the store clerk by the customer service support unit 12*e* are provided.

First, generation of the event information is described. The event information is generated each time an event is detected in any of the set areas. However, if an event is in the same area with the same ID as the event information stored so far, an IN or OUT column of the event information stored so far is updated based on prescribed conditions. The event includes two types of events, an event related to entering and leaving an area, and an event related to the sensor (sensor event) that detects the signal of the sensor 60*a* provided in the RFID medium 60.

When the transmitter of the radio wave enters an area, the time is recorded in the IN column in units of hours, minutes, and seconds along with the identified ID and the identified area. The time can be recorded in milliseconds, and may also be recorded in years, months, and days. If no detection of leaving the area (OUT detection) after entering the area is present, the OUT column will be blank (For example, Event No. I0001 and Event No. I005).

When the transmitter of the radio wave leaves the area, a time is recorded in the OUT column of latest event information related to the same ID and the same area among the event information that has already occurred. When no event information related to the same ID and the same area for this OUT detection is present or when the event information about the same ID and the same area exists but is already recorded in the OUT column, new event information is generated as a new event (not applicable in FIG. 9). In this case, the IN column of the newly generated event information is blank, and the time is recorded only in the OUT column.

Exemplarily, when the detected event is a sensor event, the time is recorded using the OUT column (for example, Event No. I004). The signal of the sensor 60*a* is described only in the OUT column regardless of whether only one signal or a plurality of signals are detected, and the sensor event column is displayed with a highlight. The highlight is to instantly identify the sensor event from the list. If the event is based on the sensor 60*a*, the signal of the sensor detected in the non-area space may also be included in the event information. That is, information indicating that a price tag is confirmed in the non-area space is also added to the event information.

The list of the event information shown in FIG. 9 can be confirmed by the store clerk in real time on the store clerk terminal 30 (see FIG. 1) or the like. Then, when the store clerk touches any event information in the list, for example, the list is switched to a screen related to the sketch of the store as shown in FIG. 3 and FIG. 4, and the information about the transmitter of the radio wave, the position information (area information), time of occurrence, status, and the like are displayed (not shown). As for the information related to the transmitter of the radio wave, if the transmitter of the radio wave is a customer who is accumulated in the customer information, past store visit information, purchase records, inquiry records, and the like are displayed (not shown). If the transmitter of the radio wave is an item, information regarding an arrival time, sales quantity, sales price transition, remaining quantity, presence or absence of stock, manufacturer name, and the like are displayed (not shown). As the information regarding the transmitter of the radio wave, only the information for which the customer service support information is notified (the information with a circle in the customer service support information in FIG. 9) may be displayed.

In the above, the coat 201 and the jacket 202 are described as the items in the store 100, but in the store system 1, all the items in the store 100 can be managed via the RFID medium 60 regardless of the item being in the backyard 124 or in the counter or purchased by the visitor. Then, the store system management device 10 can automatically order each item based on the number of stocks (the number in the counter of the store 100 and the number in the backyard 124). For this reason, the store system 1 constantly takes inventory of all items with no need for labor for the inventory and ordering by the store clerk. Since the inventory and ordering are labor-intensive tasks, introduction of the store system 1 makes it possible to reduce the number of store clerks.

Next, a method for determining the status is described. Details are given hereinafter based on a flowchart. The status determination unit 12*d* (see FIG. 2) first determines whether the transmitter of the radio wave is a visitor, an item, or a store clerk based on the ID, and then determines whether to determine a status of the visitor, the item, or the store clerk. Then, the status is determined based on presence or absence of IN, presence or absence of OUT, a time from IN to OUT, and presence or absence of association with other event information.

In FIG. 9, for example, Events Nos. M001 to M004 are event information in which the visitor with the ID of "1001" moves in front of the mannequin 101. Here, the event information of M001 is determined as a "staying" status since the time obtained by subtracting IN from OUT exceeds a predetermined time (for example, 10 seconds). Meanwhile, M002 to M004 are determined as a "passing" status since the time obtained by subtracting IN from OUT does not exceed a predetermined time (for example, 10 seconds). According to these statuses, it is presumed that the visitor who was "staying" in the area 901 was looking at the mannequin 101 or the inside of the store in the area 901, and then "passed" from the area 902 to the area 904. The "predetermined time" can be set freely.

Since Event No. M005 has an association with other event information (Event No. I001), the status is determined based on the association with other event information. Specifically, Event No. M005 and Event No. I001 are event information related to the area 929. Since the OUT time of M005 is 15:24:42 and the OUT time of I001 is 15:24:41, the OUT times of both are within a predetermined range (within a predetermined time difference, for example, 2 seconds). Therefore, the event information of M005 and the event information of I001 are associated with each other by the status determination unit 12d. The event information of M005 is determined to be a status of taking out the item. The event information of I001 is determined to be a status of (the item) being taken out.

The event information of Event No. M005 is indicated by the circle mark in the column of the customer service support information. The mark indicates that the customer service support unit 12e (see FIG. 2) determines that it is time to indicate the customer service support information. Specifically, the IN time of M005 is 15:22:02, and after that, the visitor stays in the same area (area 929) for more than a prescribed time (for example, 120 seconds). Therefore, the customer service support unit 12e determines that it is time for the store clerk to take an active response to the visitor. The customer service support unit 12e notifies the store clerk of the customer service support information via the store clerk terminal 30 or the WD 40 at 15:24:02 when 120 seconds passes from 15:22:02, which is the IN time of M005. Therefore, "notification" is recorded in the event information of Event No. S001 including 15:24:02, which is a notification time to the store clerk.

If it is determined that the status of the store clerk is in customer service, the customer service support information does not need to be notified.

The customer service support unit 12e determines that it is time to indicate the customer service support information when the visitor stays in a predetermined area for a prescribed period of time or more, when the visitor stays in a predetermined area for a plurality times, when the visitor confirms the price tag, or the like. The notification of the customer service support information may be in a manner that sensory organs of the store clerk can feel. It is assumed to be a manner that can be sensed visually, auditorily, tactilely (pressing, vibration, electric shock, and the like) or olfactorily via the store clerk terminal 30 including the WD 40.

When the customer service support information is transmitted, the signage display unit 12g can display sales promotion information according to the status of the visitor, attributes of the visitor, and the like on the digital signage 50 near the visitor. The sales promotion information is, for example, coupons, time-limited point-up information, related items, and recommended items. The recommended items are not only items that are excellent in combination with items that the visitor is currently picking up, but also items that are excellent in combination with the items that the visitor has purchased in the past. Such sales promotion information customized for each visitor is information that the visitor feels comfortable with, and is a factor for the visitor to enjoy purchasing experience at the store.

Next, a control content of the execution unit 12 of the store system 1 will be described with reference to FIGS. 10 to 12. Hereinafter, a control content of each of the event detection unit 12b, the status determination unit 12d, and the customer service support unit 12e will be described.

Figure 10:
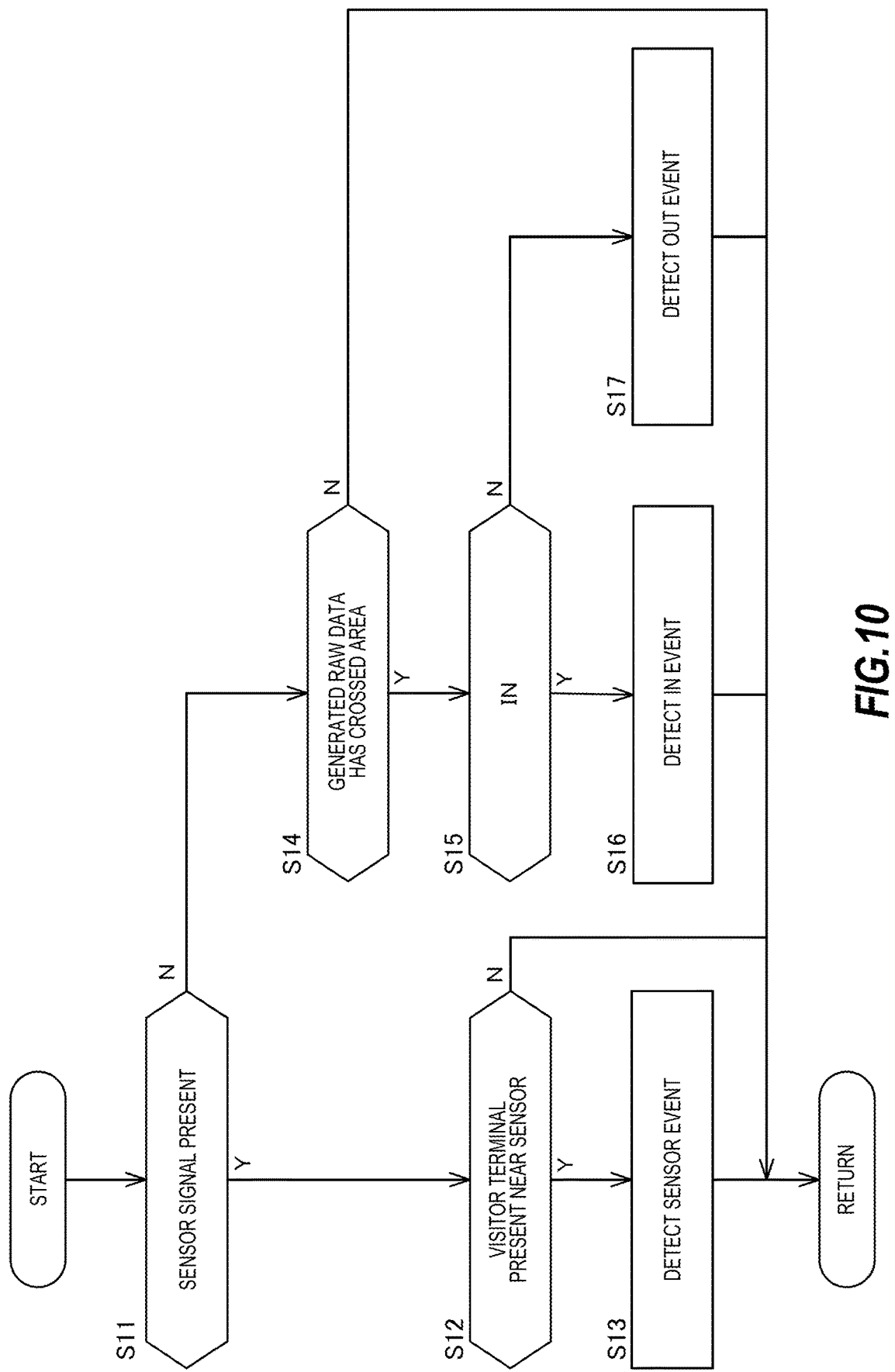
FIG. 10 is a flowchart illustrating a control content of an event detection unit.

FIG. 10 is a flowchart illustrating the control content of the event detection unit 12b. The following control is repeatedly executed at a predetermined cycle.

The event detection unit 12b first determines whether the tag sensor detection unit 12c detects a signal from the sensor 60a (pressure sensor, current sensor) attached to the RFID medium 60 (S11). If the signal from the sensor 60a is detected, the event detection unit 12b determines whether the visitor terminal 70 is located near the sensor 60a that transmits the signal (near the RFID medium 60) (S12). If the visitor terminal 70 is located near the sensor 60a, the event detection unit 12b detects the sensor event (S13). In the sensor event, it is assumed that the price tag is picked up by a hand, but in order to exclude that the sensor 60a is touched by the store clerk, during the detection of the sensor event, it is determined in S12 whether or not the visitor terminal 70 is located near the RFID medium 60. If a determination result of S12 is "No", the event detection unit 12b ends this process.

If the signal from the sensor 60a is not detected, the event detection unit 12b determines whether the generated raw data (the transmitter of the radio wave) has crossed the area (S14). The determination is made based on a comparison of the position information (coordinate values) between the raw data immediately before using the ID as a key and the raw data generated now among the continuously generated raw data. Crossing the area includes moving from one area to another, exiting from an area space to a non-area space, and entering an area space from a non-area space.

If it is determined that the generated raw data crosses the area, the event detection unit 12b determines whether the raw data is "IN" of entering the area (S15). If it is IN, an IN event is detected (S16), and if it is not IN, an OUT event is detected (S17). A step of S15 may be omitted, and IN or OUT may be detected directly from the determination result in S14. In this case, OUT of leaving from one area and IN of entering another area can be detected at the same time.

If the determination result of S14 is "No" or if any event is detected, the event detection unit 12b then ends this process.

Figure 11:
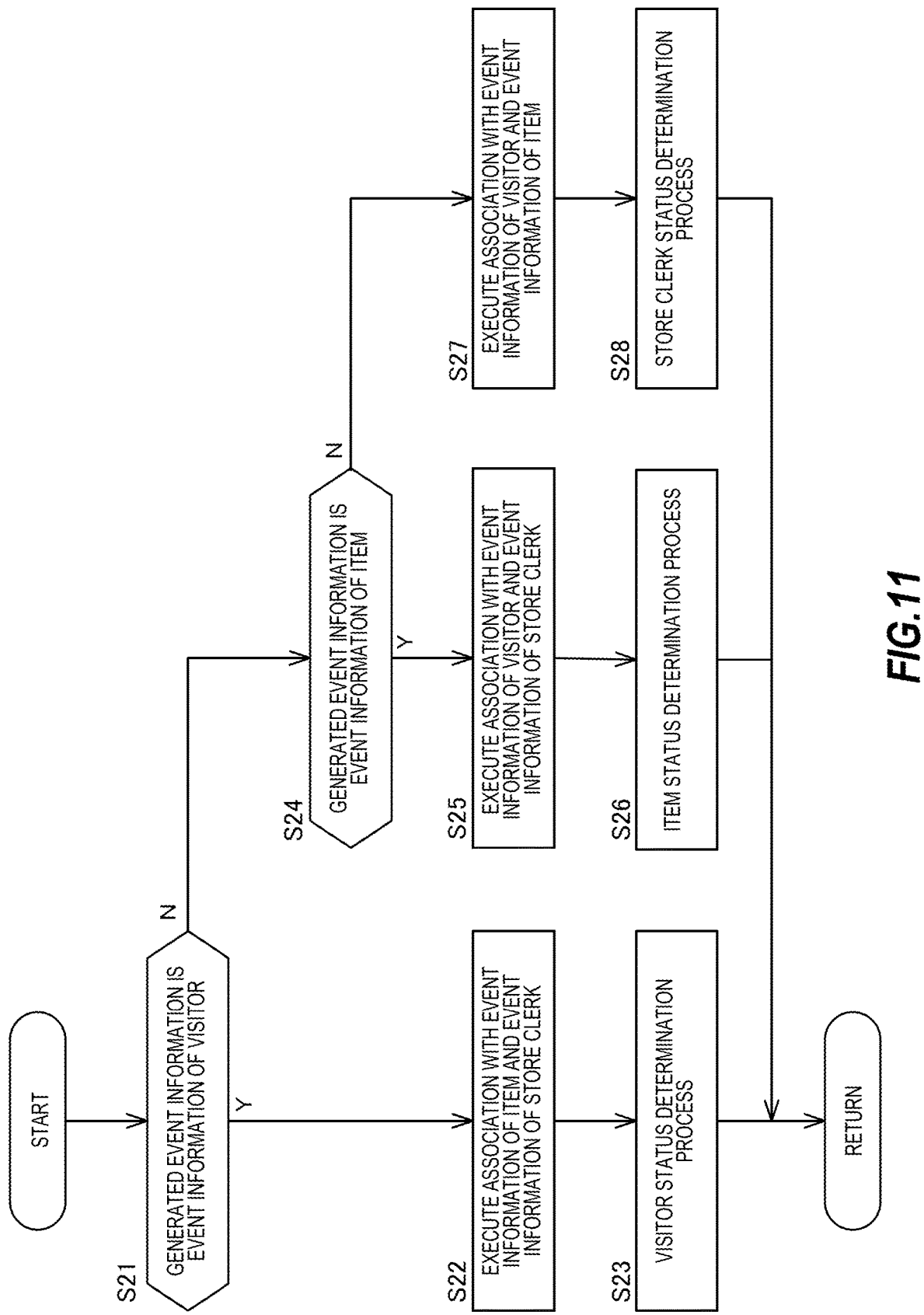
FIG. 11 is a flowchart illustrating a control content of a status determination unit.

FIG. 11 is a flowchart illustrating the control content of the status determination unit 12d. A status determination process may be executed at a timing when the event information is generated and updated (for example, OUT is recorded in the event information in which only IN is recorded), or may be repeatedly executed at a predetermined cycle. Here, the event information of the store clerk will also be described as the control content during the status determination.

The status determination unit 12d first determines whether the generated or updated event information is the event information of the visitor (S21). If a determination result is "Yes", the event information generated this time is associated with the event information of the item and the event information of the store clerk (S22). If IN information with an ID different from the ID of this event information (ID of the visitor) is present in an area that is the same as or adjacent to the area of this event information, and a difference between times is within a predetermined time difference, the association is made. Similarly, association is made based on the OUT information. Next, the status determination unit 12d executes a visitor status determination process for determining the status of the visitor (S23), and ends this process.

If the determination result is "No" in S21, the status determination unit 12d determines whether the generated or updated event information is the event information of the item (S24). If the determination result is "Yes", the event information of this time is associated with the event information of the visitor and the event information of the store clerk (S25). Next, the status determination unit 12d executes an item status determination process for determining the status of the item (S26), and ends this process.

If the determination result is "No" in S24, the event information of this time is the event information of the store clerk. Therefore, the event information of this time is associated with the event information of the visitor and the event information of the item (S27). Next, the status determination unit 12d executes a store clerk status determination process for determining the status of the store clerk (S28), and ends this process.

Details of the visitor status determination process, item status determination process, and store clerk status determination process are omitted. However, in each case, the status is determined based on whether the event content is IN or OUT, whether or not it is associated with other event information, the area where the event occurs, and the like.

In this way, in a plurality of pieces of event information having different IDs, the status determination associates the event information within a predetermined time difference with each other when a time difference between the occurrence times of the events of entering a predetermined area and the occurrence times of the events of leaving the predetermined area are within the predetermined time difference. Then, the status of each event information can be determined based on the association of a plurality of pieces of event information. When the status of the event information of the store clerk is not determined, if the determination result of S24 is "No", this process ends without executing the step of S28.

Figure 12:
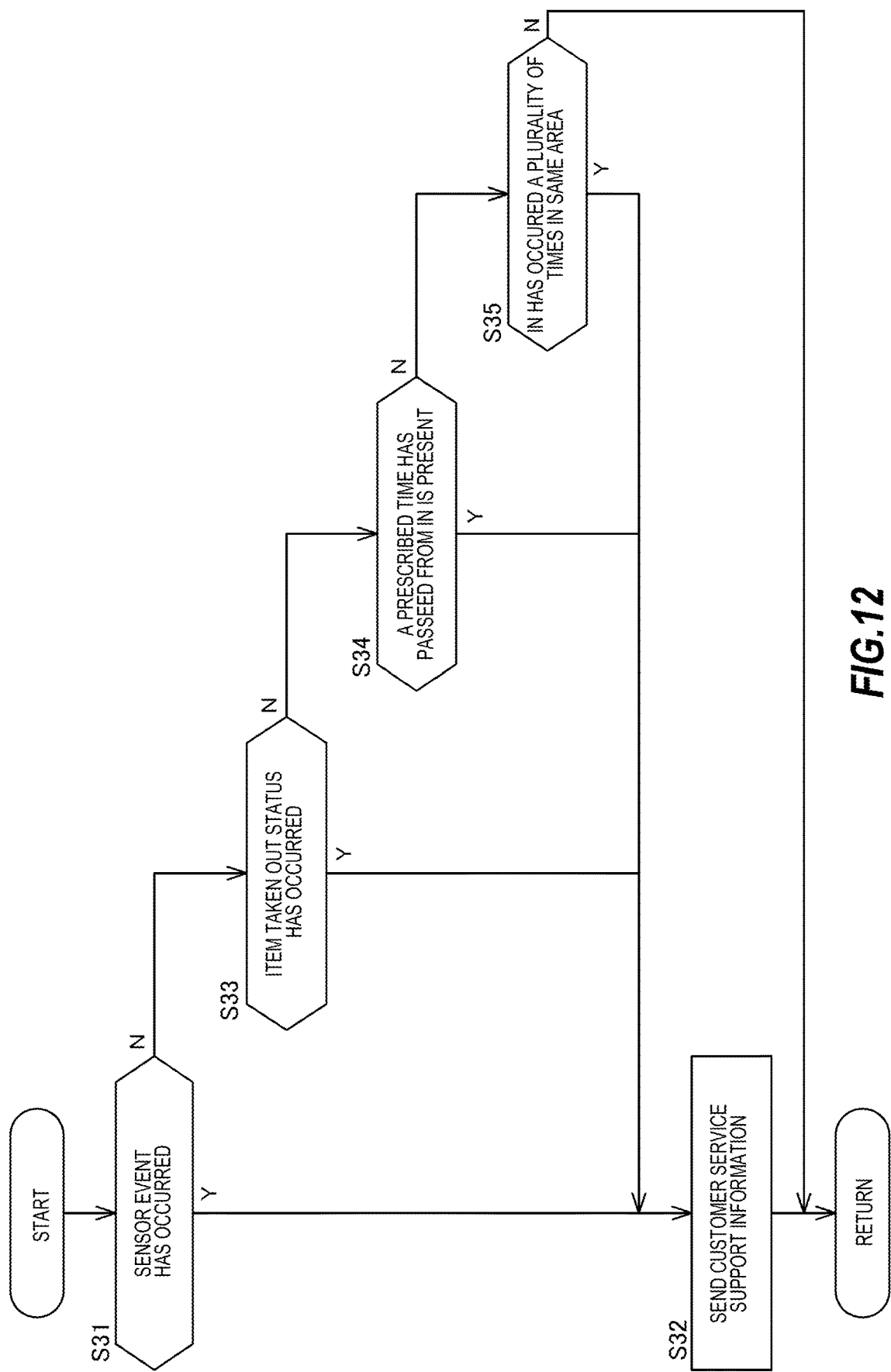
FIG. 12 is a flowchart illustrating a control content of a customer service support unit.

FIG. 12 is a flowchart illustrating the control content of the customer service support unit 12e. The following control is repeatedly executed at a predetermined cycle.

The customer service support unit 12e first determines whether or not a sensor event has occurred (S31). If the sensor event has occurred, the customer service support unit 12e transmits the customer service support information to the store clerk terminal 30 (S32). If the sensor event has occurred, it is detected that the price tag is confirmed by the visitor, so it is an appropriate timing to start active customer service.

If no sensor event has occurred, the customer service support unit 12e determines whether the status of the item being taken out by the visitor has occurred (S33), and if the status has occurred, the customer service support information is transmitted to the store clerk terminal 30 or the like (S32). The status of the item being taken out is appropriate as a timing to start active customer service since the item is taken out from the set area by the visitor and moved.

If the status of the item being taken out does not occur, the customer service support unit 12e determines whether event information of a visitor in which the OUT column is blank and a prescribed time (for example, 120 seconds) has passed from IN (S34) is present. If event information of a visitor in which a prescribed time passes since IN is present, the customer service support unit 12e transmits the customer service support information to the store clerk terminal 30 (S32). If the visitor stays in the same area for a long time, it is assumed that the visitor is highly interested in an item placed in the area, so it is an appropriate timing to start active customer service.

If no event information of a visitor in which a prescribed time passes since IN is present, the customer service support unit 12e determines whether or not IN has occurred a plurality of times in the same area by the same visitor (S35). If IN occurs a plurality of times in the same area, the customer service support unit 12e transmits the customer service support information to the store clerk terminal 30 (S32). If the same visitor frequently enters the same area, it is assumed that the visitor is highly interested in an item placed in the area. Therefore, it is an appropriate timing to start active customer service.

If IN does not occur a plurality of times in the same area by the same visitor (the determination result in S35 is "No") or after sending the customer service support information to the store clerk terminal 30 (S32), the customer service support unit 12e ends this process.

Figure 13:
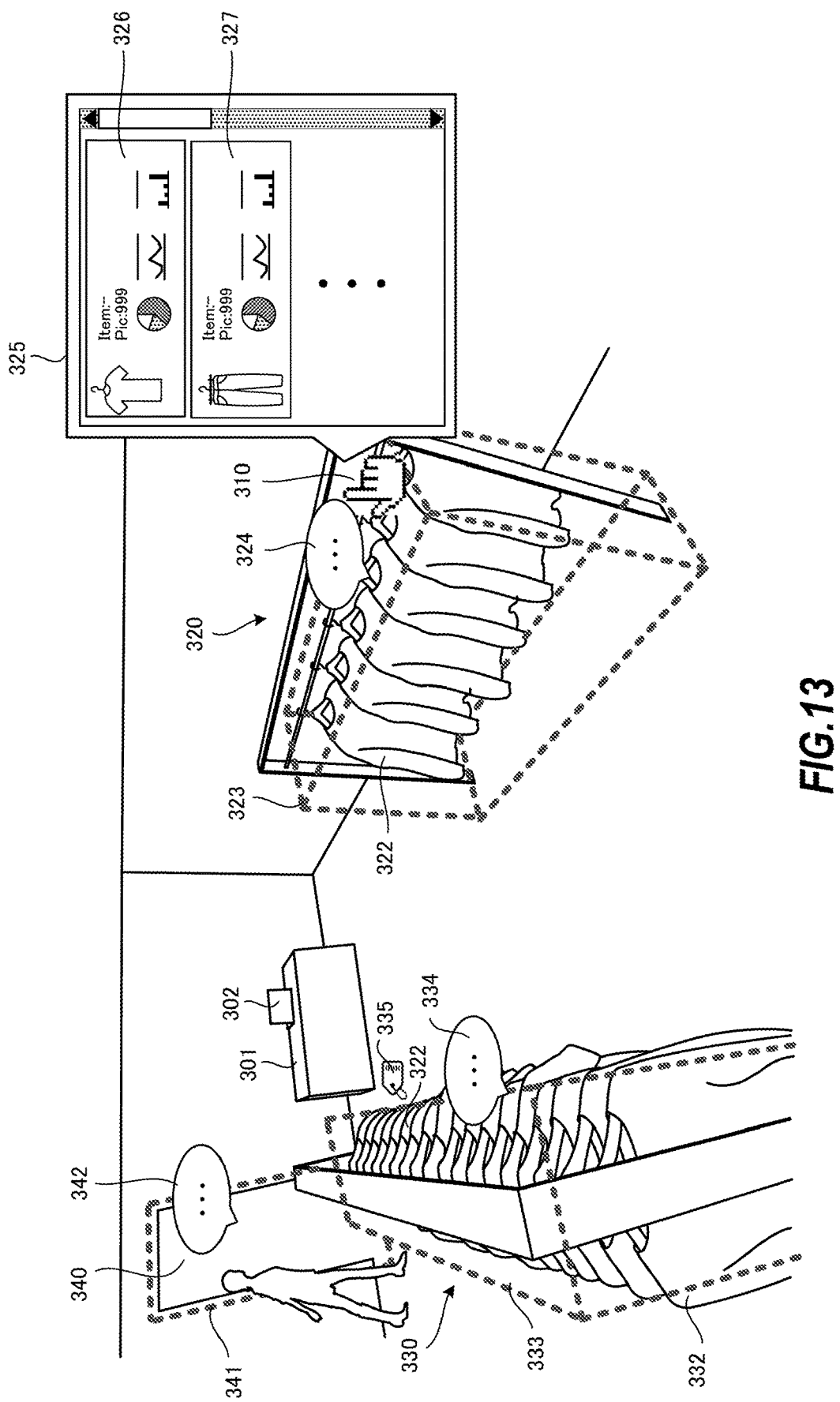
FIG. 13 is a diagram illustrating a store space visually recognized by a store clerk via a wearable display (WD)

Next, work support using the WD 40 by the store system 1 is described. FIG. 13 is a diagram illustrating the store space visually recognized by the store clerk via the WD 40. Here, the WD 40 will be described as a head-mounted display type terminal.

The head-mounted display type WD 40 is a terminal that implements a mixed reality (MR) space in which a virtual image that can be operated is superimposed on a real space by projecting a 3D image by hologram on a glass portion. Since an MR technique allows a plurality of people to share the same MR space at the same time, no time lag is present in information sharing among a plurality of store clerks, enabling smooth work progress. The virtual image can be operated by movement of a body, voice, and the like by a person wearing the WD 40 terminal, and the virtual image can be enlarged, reduced, rotated, and switched to another information. If the WD 40 can detect the movement of the eyeballs (movement of the line of sight), the virtual image can be operated by the movement of the line of sight of the store clerk.

Referring to FIG. 13, the store space is provided with a desk 301, a work terminal 302, an outer counter 320, a knit counter 330, and a doorway 340. Then, a pointer 310, which indicates an operation location in the MR space, a guide 323, which indicates the area of the outer counter 320, a guide 333, which indicates the area of the knit counter 330, a guide 341, which indicates the area of the doorway 340, text bubbles 324, 334, and 342, which indicate where information is retrieved in each area, a balloon 325 displayed corresponding to the text bubble 324, and a virtual tag 335 are displayed as the virtual image.

The pointer 310 operated by the movement of the body of the store clerk is in a position where the text bubble 324 is touched, and information corresponding to the text bubble 342 is displayed on the balloon 325. Item data 326 and item data 327 are displayed on the balloon 325. The item data 326 is, for example, information on an inner related to an outer 322, and displays a sales quantity, unit sales, a purchasing age group, and the like for each color of the inner. It is possible to display a stock quantity, price transition, sale time, and the like of the inner by switching information.

The balloon 325 can display information that can be used to explain the item to the visitor. For example, a stock status by size and color at other stores, a content related to a washing method and discoloration of the outer 322, contents related to dressing and combination, an association with trends, a recommended scene, which model wore it in which magazine, which actor wore it on which show, and the like. Therefore, even a store clerk who lacks item knowledge about the outer 322 can smoothly serve customers with no need to move to a position of the work terminal 302 to check the information.

The text bubble 334 indicates presence of information related to the knit counter 330, and the text bubble 342 indicates presence of information about the visitor.

In the knit counter 330, only one outer 322 is hung among a large number of knits 332. Since it is difficult to distinguish the outer 322 from a large number of knits 332, the virtual tag 335 is displayed at a position corresponding to the outer 322. The virtual tag 335 notifies existence of the so-called lost item that is located outside the original counter. The virtual tag 335 is displayed as item management support information, and the lost item may be overlaid with information that attracts attention of the store clerk, regardless of the virtual tag 335.

A text bubble may be generated corresponding to the outer 322, and information about the outer 322 can be displayed on the balloon by performing an operation of moving the pointer 310 to the text bubble.

For example, if the lost item is found by a visitor who wants an M size item, it will lead to a purchase, but if the remaining one M size item is placed in another location, it will cause sales loss of losing a sale opportunity. Therefore, it is possible to prevent sales loss by promptly returning the lost item to an original position thereof. However, since the store clerk cannot always search for the lost item, when the item management support unit 12h detects the lost item, the store clerk is notified as appropriate. For this reason, the item management support unit 12h saves labor for the store clerk to search for the lost item.

Figure 14:
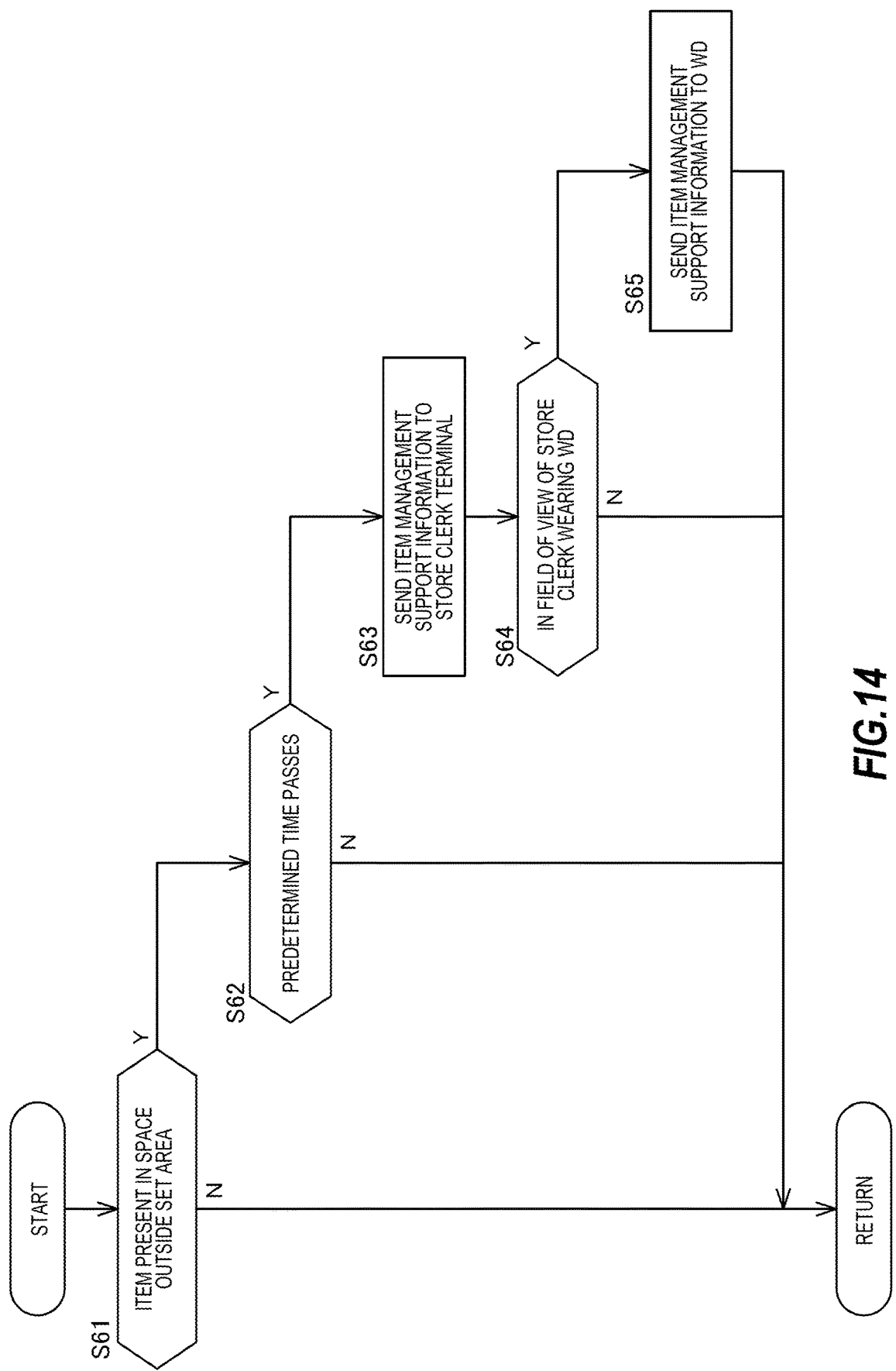
FIG. 14 is a flowchart illustrating a control content of an item management support unit.

Next, the control content by the item management support unit 12h will be described. FIG. 14 is a flowchart illustrating the control content of the item management support unit 12h.

The item management support unit 12h first determines whether or not an item is present in a space outside a set area, which is an original sales area (S61). If an item is present in the space outside the set area, the item management support unit 12h determines whether a predetermined time passes since the item went out of the set area (S62).

When the predetermined time passes, the item management support unit 12h transmits the item management support information to the store clerk terminal 30 (S63), and determines whether a current position of the item is in the field of view of the store clerk wearing the WD (S64). If the current position of the item is in the field of view of the store clerk, the item management support unit 12h transmits the item management support information to the WD 40 (S65), and ends this process.

If a determination result of S61 is "No", a determination result of S62 is "No", and a determination result of S64 is "No", the item management support unit 12h then ends this process. The item management support information may be transmitted based on a request from the store clerk. Setting information regarding the original sales area may be stored in the RFID medium 60, or may be stored in the setting information storage unit 13d.

According to the above embodiment, the store system 1 exerts the following effects.

The store system 1 acquires the position information from a plurality of RFID medias 60 and visitor terminals 70, and when the occurrence of the event of entering or leaving a predetermined area is detected, the store system 1 generates the event information including the occurrence position of the event, the detection time of the event, and the ID. Furthermore, the store system 1 (status determination unit 12d) determines the item status or the visitor status based on the generated event information, and adds the status to the event information.

Accordingly, the position information of the item and the visitor is acquired, and when the event that the item or the visitor enters/leaves the predetermined area is detected, the position information and the like are generated as the event information, and thus the status is determined based on the event information.

If the detection times of a plurality of pieces of event information are within a predetermined time difference, the status determination unit 12d determines the status of each event information by associating the plurality of pieces of event information within the predetermined time difference.

Accordingly, for example, it is possible to make association for the item being taken out by the visitor, and it is possible to determine the status by associating each piece of event information.

If the time difference between the IN of the event information of the item and the IN of the event information of the visitor is within a predetermined time difference, the status determination unit 12d determines the status of each event information by associating both event information.

Accordingly, for example, it is possible to make association for the item being returned by the visitor, and determine the status by associating the pieces of event information in which IN is within a predetermined time difference.

The RFID medium 60 includes the sensor 60a and generates the event information based on the operation of the sensor 60a.

Accordingly, for example, if the event that the sensor 60a operates is detected from the RFID medium 60 corresponding to the item, which is a plurality of pieces of associated event information such as the item being taken out by the visitor, it can be determined that the price tag of the item being taken out by the visitor is confirmed.

The store system 1 also constantly acquires the position information of the store clerk, and when the store clerk terminal 30 and the visitor terminal 70 are located in a predetermined area at the same time, the status of the visitor is updated.

Accordingly, it is determined that the visitor is being served by the store clerk.

The status determination unit 12d updates the status based on the OUT time.

Accordingly, when a piece of prescribed event information has a long staying time, the status is updated from the initially determined status to "staying".

In the store system 1, only the position information at the detection time of the event is stored as event information among the raw data continuously acquired.

Accordingly, while collecting the raw data related to the position information that is constantly acquired as the big data, the position information and the like are extracted and stored as the event information when an event occurs. In other words, an amount of data actually handled can be reduced by extracting event information, which is useful information for the store operation and store management, from the raw data that has a huge amount.

In particular, if the raw data is constantly stored and analysis is performed directly from the raw data, the amount of data to be handled will be enormous, and a cost of operating the system and a time required for analysis will be enormous. Therefore, the event is set in advance for the necessary information, and the event information is extracted when the event is detected, so that the above cost and time can be significantly reduced.

When it is detected that the same visitor enters a predetermined area for a plurality of times, the store system 1 transmits the customer service support information to the store clerk terminal 30.

Accordingly, since it is assumed that the visitor who visits the same location for a plurality of times is highly interested in the item or the like in that location, the customer service support information is transmitted to the store clerk as it is an appropriate timing for the store clerk to start active service for the customers. As a result, the store clerk can provide effective customer service to the visitor.

The store system 1 transmits the customer service support information to the WD 40 worn by the store clerk.

Accordingly, the store clerk can acquire the customer service support information through a wearable display and can serve the customers while displaying a wide range of information about the visitor and the item in sight. As a result, the store clerk can provide effective customer service to the visitor.

Accordingly, the store system 1 generates the event information when the store system 1 acquires the position information of the visitor or the item and detects an event in the set area. Then, the status determination by the event information alone, or the status determination by associating different types of event information is performed. Therefore, it is possible to understand how the visitor is involved with the item and the store clerk, how the item is handled, and how the store clerk is doing work. In other words, purchasing behaviors of a large number of visitors are digitized, accumulated, and used for analysis. This makes it possible to adopt a marketing method similar to that of an EC site capable of tracking to a physical store to which the store system 1 is introduced.

In the above embodiment, the customer service support system (customer service support unit 12*e*) exerts the following effects.

The customer service support system transmits the customer service support information to the store clerk terminal 30 when the visitor stays in a predetermined area for a predetermined time or longer.

Accordingly, since it is assumed that the visitor who stays for a predetermined time or longer is highly interested in the item or the like in that location, the customer service support information is transmitted to the store clerk. As a result, the store clerk can provide effective customer service to the visitor.

The customer service support unit 12*e* transmits the customer service support information to the store clerk terminal 30 when the visitor enters a predetermined area for a predetermined number of times or more.

Accordingly, since it is assumed that the visitor who stops by for a predetermined number of times or more is highly interested in the item or the like in that location, the customer service support information is transmitted to the store clerk. As a result, the store clerk can provide effective customer service to the visitor.

When the signal of the sensor 60*a* included in the RFID medium 60 is detected, the customer service support unit 12*e* transmits the customer service support information to the store clerk terminal 30.

Accordingly, since it is assumed that the visitor who checks the price of the item or the like is highly interested in the item or the like, the customer service support information is transmitted to the store clerk. As a result, the store clerk can provide effective customer service to the visitor.

When the customer service support information is sent to the store clerk terminal 30, the signage display unit 12*g* displays the sales promotion information to the visitor.

Accordingly, the fact that the customer service support information is transmitted to the store clerk terminal 30 means that the visitor is determined to be highly interested in the item or the like. Therefore, by displaying the sales promotion information (for example, the coupons and the recommended items) through the digital signage 50, effective sales promotion activities can be performed.

In particular, the visitor can enjoy the purchasing behavior at retail stores more than ever by coming into contact with the customized sales promotion information addressed to the visitor.

The customer service support system transmits the customer service support information to the WD 40 worn by the store clerk.

Accordingly, the store clerk can acquire the customer service support information through a wearable display and can serve the customers while displaying a wide range of information about the visitor and the item in sight. As a result, the store clerk can provide effective customer service to the visitor.

Accordingly, since the customer service support system (customer service support unit 12*e*) determines the interest of the visitor in the item, the status of interest, and the action content of the visitor based on the position information, the staying time, and the like of the visitor. Therefore, the store clerk is notified without omission when to start active service after considering a psychological state of the visitor. For this reason, even a store clerk with low experience and low customer service skills can actively respond at a right timing, and even when the store clerk is responding to other situations, the visitor can be paid attention to. As a result, the customer service support system contributes to the improvement of sales of the store 100.

In the above embodiment, the item management support system (item management support unit 12*h*) exerts the following effects.

When the item is located in an area different from a predetermined area for a predetermined time or longer, the item management support system transmits the item management support information including information about the area where the item is located to the store clerk terminal 30.

Accordingly, since the store clerk is notified of the area where the item that is moved from the original counter to a different location (lost item) is located, the store clerk can quickly find the item and return the item to the original counter. Therefore, it is possible to avoid loss of the sales opportunity.

The item management support information includes information about the predetermined area.

Accordingly, since the store clerk is notified of where the original counter of the lost item is, the store clerk can quickly return the item to the original counter.

The item management support unit 12h transmits the item management support information to the WD 40.

Accordingly, the store clerk acquires the item management support information through the wearable display, and a current area and the original area of the lost item are displayed in sight. As a result, work of the store clerk is streamlined.

The item management support system stores the predetermined area in an RFID.

Accordingly, since the information about the original counter is stored in the memory area of the RFID medium 60, for example, even if only the RFID medium 60 and the store clerk terminal 30 are used, the information about the original counter can be obtained from the RFID medium 60.

The item management support system stores the predetermined area in a server.

Accordingly, even if a counter of a specific item group is changed, the information about the original counter can be updated in a batch on the server. Therefore, labor required to set the original counter for changes in the counter is minimized.

Accordingly, when it is detected that an item or the like is moved from the original counter, the item management support system (item management support unit 12h) notifies the store clerk of the item management support information at an appropriate timing. Based on the item management support information, the store clerk returns the item or the like to the original position, so that the sales loss can be prevented.

Although the embodiment of the present invention have been described above, the above embodiment merely exemplifies one of application examples of the present invention and does not intend to limit a technical scope of the present invention to a specific configuration of the above embodiment.

For example, although the store 100 has been described as an apparel retail store, the work format of the store 100 is not limited to apparel. The store system 1 is devised as a platform in the IoT field in a retail industry, and corresponds to the entire retail industry.

As the various programs executed by the store system management device 10, those stored in a non-transient recording medium such as a CD-ROM may be used.

The present application claims priority under Japanese Patent Application No. 2019-26942 filed to the Japan Patent Office on Feb. 18, 2019, and an entire content of this application are incorporated herein by reference.

The invention claimed is:

1. A store system, comprising:
    a position information acquisition unit configured to acquire first position information of a radio frequency identifier (RFID) medium attached to an item and second position information of a visitor terminal carried by a visitor;
    an event detection unit configured to detect a first event that the RFID medium or the visitor terminal enters or leaves a predetermined area in a store space based on the acquired first position information and second position information;
    an event information storage unit configured to store event information of the item including an identifier (ID) that identifies the RFID medium, information about the predetermined area based on the acquired first position information and second position information, and a detection time of the first event and event information of the visitor including an identifier (ID) that identifies the visitor terminal, information about the predetermined area based on the acquired first position information and second position information, and a detection time of the first event; and
    a status determination unit configured to determine a status, which is a state of the item or is an action content of the visitor, the state of the item referring to whether i) the item was taken out, ii) the item was returned, iii) a price of a tag of the item was confirmed, or iv) the item was purchased, and the action content of the visitor referring to whether v) the visitor is passing by the item, vi) the visitor is staying in the predetermined area, vii) the visitor is taking out the item, viii) the visitor is confirming the price of the tag of the item, ix) the visitor is returning the item, or x) the visitor is trying on the item, based on an association between the event information of the item and the event information of the visitor.

2. The store system according to claim 1, wherein the status determination unit is configured to, in response to a plurality of pieces of event information in which detection times of a plurality of the first event are within a predetermined time difference, associate the plurality of pieces of event information within the predetermined time difference and determine the status based on the pieces of event information.

3. The store system according to claim 2, wherein the status determination unit is configured to, in response to times of entering the predetermined area being within the predetermined time difference between the event information by the RFID medium and the event information by the visitor terminal, associate the event information by the RFID medium with the event information by the visitor terminal and determine the status based on each event information.

4. The store system according to claim 2, wherein the RFID medium includes a sensor configured to detect a contact with a human body by pressure or bioelectric current, and
the event detection unit is configured to detect a second event that the sensor is activated based on an output signal of the sensor.

5. The store system according to claim 1, wherein the position information acquisition unit is configured to acquire third position information of a store clerk terminal used by a store clerk for work,
the event detection unit is configured to detect a third event that the store clerk terminal enters or leaves the predetermined area, and
the status determination unit is configured to update the status based on the event information corresponding to the visitor terminal in response to the visitor terminal and the store clerk terminal being located in the predetermined area at the same time.

6. The store system according to claim 5, further comprising:
    a customer service support unit configured to transmit customer service support information to the store clerk terminal based on the event information, wherein the customer service support unit is configured to, in response to a plurality of pieces of event information indicating that the visitor terminal enters the predetermined area being generated by the visitor terminal, transmit the customer service support information to the store clerk terminal.

7. The store system according to claim 6, wherein the customer service support unit is configured to transmit the customer service support information to a wearable display worn by the store clerk.

8. The store system according to claim 1, wherein the status determination unit is configured to update the status corresponding to the event information based on a time of leaving the predetermined area.

9. The store system according to claim 1, wherein among the acquired first position information and second position information, only the acquired first position information and second position information at the detection time of the first event is stored as the event information.

10. A status determination method, comprising:
acquiring first position information of a radio frequency identifier (RFID) medium attached to an item and second position information of a visitor terminal carried by a visitor;
detecting an event that the RFID medium or the visitor terminal enters or leaves a predetermined area in a store space based on the acquired first position information and second position information;
storing event information of the item including an identifier (ID) that identifies the RFID medium, information about the predetermined area based on the acquired first position information and second position information, and a detection time of the event and event information of the visitor including an identifier (ID) that identifies the visitor terminal, information about the predetermined area based on the acquired first position information and second position information, and a detection time of the first event; and
determining a state of the item or a status of the visitor, which is an action content, the state of the item referring to whether i) the item was taken out, ii) the item was returned, iii) a price of a tag of the item was confirmed, or iv) the item was purchased, and the action content of the visitor referring to whether v) the visitor is passing by the item, vi) the visitor is staying in the predetermined area, vii) the visitor is taking out the item, viii) the visitor is confirming the price of the tag of the item, ix) the visitor is returning the item, or x) the visitor is trying on the item, based on an association between the event information of the item and the event information of the visitor.

11. A non-transitory computer-readable medium storing a program that is capable of being executed by a computer in a store system, wherein the program causes the computer to execute instructions for:
acquiring first position information of a radio frequency identifier (RFID) medium attached to an item and second position information of a visitor terminal carried by a visitor;
detecting an event that the RFID medium or the visitor terminal enters or leaves a predetermined area in a store space based on the acquired first position information and second position information;
storing event information of the item including an identifier (ID) that identifies the RFID medium, information about the predetermined area based on the acquired first position information and second position information, and a detection time of the event and event information of the visitor including an identifier (ID) that identifies the visitor terminal, information about the predetermined area based on the acquired first position information and second position information, and a detection time of the first event; and
determining a status, which is a state of the item or is an action content of the visitor, the state of the item referring to whether i) the item was taken out, ii) the item was returned, iii) a price of a tag of the item was confirmed, or iv) the item was purchased, and the action content of the visitor referring to whether v) the visitor is passing by the item, vi) the visitor is staying in the predetermined area, vii) the visitor is taking out the item, viii) the visitor is confirming the price of the tag of the item, ix) the visitor is returning the item, or x) the visitor is trying on the item, based on an association between the event information of the item and the event information of the visitor.

* * * * *